(12) United States Patent
Hayakawa et al.

(10) Patent No.: US 6,191,426 B1
(45) Date of Patent: Feb. 20, 2001

(54) CASSETTE

(75) Inventors: Kazushi Hayakawa, Hino; Masakazu Ando, Sayama, both of (JP)

(73) Assignee: Konica Corporation, Tokyo (JP)

( * ) Notice: Under 35 U.S.C. 154(b), the term of this patent shall be extended for 0 days.

(21) Appl. No.: 09/186,263

(22) Filed: Nov. 4, 1998

(30) Foreign Application Priority Data

Nov. 10, 1997 (JP) .................................................. 9-307177
Dec. 3, 1997 (JP) .................................................. 9-332906

(51) Int. Cl.⁷ .................................................. G03B 42/04
(52) U.S. Cl. .................................. 250/484.4; 250/485.1; 250/584; 250/588
(58) Field of Search ............................ 250/484.4, 485.1, 250/584, 588, 589, 581

(56) References Cited

U.S. PATENT DOCUMENTS

| | | | | |
|---|---|---|---|---|
| 5,065,866 | * | 11/1991 | Boutet et al. | 250/581 |
| 5,090,567 | * | 2/1992 | Boutet | 250/589 |
| 5,265,865 | * | 11/1993 | Agano et al. | 250/588 |
| 5,475,230 | * | 12/1995 | Stumpf et al. | 250/584 |
| 6,032,856 | * | 3/2000 | Bischoff et al. | 250/484.4 |

* cited by examiner

*Primary Examiner*—Constantine Hannaher
*Assistant Examiner*—Otilia Gabor
(74) *Attorney, Agent, or Firm*—Frishauf, Holtz, Goodman, Langer & Chick, P.C.

(57) ABSTRACT

A cassette in which a radiographic image converting plate is accommodated, comprises a case having an opening; a tray on which the radiographic image converting plate is loaded; and a cap capable of being fitted with the opening, the cap connected with the tray so that the tray is moved together with the cap so as to be inserted into or drawn out from the case through the opening, the position of the cap capable of being displaced relative to the tray.

23 Claims, 25 Drawing Sheets

CASSETTE

BACKGROUND OF THE INVENTION

The present invention relates to a cassette containing a radiographic image converter plate on which radiographic images are stored.

On a radiographic image converter plate on which radiographic images are stored, the images are deteriorated including that the radiographic images are erased, when they are subjected to light-irradiation. Therefore, each of the radiographic image converter plates is contained in the cassette which is optically shielded against light, to be carried.

An example of the cassette will be explained with reference to FIG. 25. On case 102 in the drawing, there is formed opening 104 whose one side is open.

On the other hand, flexible radiographic image converter plate 106 is fixed on tray 108 having sufficient rigidity which is to be inserted in the case 102 through the opening 104 of the case 102.

Further, on the tray 108, there is integrally provided cap 110 which engages with the opening 104 of the case 102 and optically shields the inside of the case 102 against light.

Therefore, when the tray 108 is inserted in the case 102 through the opening 104 of the case 102, the cap 110 engages with the opening 104 of the case 102 and the inside of the case 102 is optically shielded against light.

In the cassette having the aforesaid structure, when foreign materials such as dust enter the case 102 from the outside thereof to stick to the radiographic image converter plate 106, it is difficult to discriminate between actual images and foreign materials on the image obtained through reading.

Accordingly, it is necessary to take out the tray 108 from the case 102 and to clean the inside of the case 102 and the tray 108.

However, the cap 110 and the tray 108 are structured solidly, which causes a problem that cleaning on vicinity B of a base portion of the cap 110 is difficult as shown in FIG. 26.

The invention has been achieved in view of the aforesaid problem, and its object is to provide a cassette wherein cleaning is easy.

FIG. 27 shows how the cassette in the conventional example stated above is loaded on image reading section 107. Radiographic images obtained on conversion plate 106 through radiographing are read by scanning the conversion plate 106 with a laser beam and by receiving stimulated emission emitted from the conversion plate with a photoreceptor section. As shown in FIG. 27, cap 110 is fixed on tray 108 in the conventional cassette. Therefore, even when the cap 110 is made to be close to image reading section 107, there still is caused relatively large gap d between the image reading section 107 and the conversion plate 106. When the gap d between the image reading section 107 and the conversion plate 106 is large, stimulated emission is disturbed in the course of image reading, reading accuracy for radiographic images is lowered, and image quality of images to be read is lowered, which are problems.

Further, as shown in FIG. 27, due to height h of internal projection of cap 110, an image area is narrowed by the height h, which is a problem.

An object of the invention is to make a gap formed between an image reading section and a conversion plate to be small even when a cassette is loaded on the image reading section, and thereby to prevent deterioration of accuracy for reading radiographic images and to prevent that an image area is narrowed.

SUMMARY OF THE INVENTION

The objects stated above can be attained by the following structures.

A cassette in which a radiographic image converting plate is accommodated, comprises:
- a case having an opening;
- a tray on which the radiographic image converting plate is loaded; and
- a cap capable of being fitted with the opening, the cap connected with the tray so that the tray is moved together with the cap so as to be inserted into or drawn out from the case through the opening, the position of the cap capable of being displaced relative to the tray.

A cassette in which a radiographic image converting plate is accommodated, comprises:
- a case having an opening; and
- a cap capable of being fitted with the opening, the cap connected with the radiographic image converting plate so that the radiographic image converting plate is moved together with the cap so as to be inserted into or drawn out from the case through the opening, the position of the cap capable of being displaced relative to the tray.

The object stated above can also be attained by the preferable structure of the invention shown below.

A cassette which is composed of a case having an opening, a tray which is arranged in the case and has thereon a radiographic image conversion plate that is fixed on the tray, and a cap which is provided to be capable of being mounted on and dismounted from the tray and engages with the opening of the case to optically shield the inside of the case against light.

Since the cap is capable of being mounted on and dismounted from the tray, the cap can be separated from the tray when cleaning, which makes the cleaning easy.

It is preferable that engagement and disengagement between the tray and the cap is carried out by a stepped pin which is provided on the tray and has a smaller diameter section that is in contact with the tray and a larger diameter section that is located at the tip portion of the pin, and an elongated hole which is provided on the part of the cap and is set to be broader than the smaller diameter section of the stepped pin and to be narrower than the larger diameter section, and is composed of a first hole portion that is set so that the cap portion can engage with the opening when the smaller diameter section of the stepped pin engages, and of a second hole portion which is provided to be connected to the first hole portion and has a width larger than the larger diameter section of the stepped pin.

When the cap is engaged with the opening of the case, the first hole portion of the elongated hole on the part of the cap is engaged with the smaller diameter section of the stepped pin on the tray, thus, the cap portion and the tray are on the statement of engagement.

To split the cap and the tray which are on the statement of engagement, the cap is required to be moved so that the smaller diameter section of the stepped pin may be located at the second hole portion of the elongated hole on the part of the cap. Since the width of the second hole portion is set to be greater than the larger diameter section of the stepped pin, the stepped pin and the elongated hole result in the state where they can be split.

In this case, when the cap is moved in the direction to be away from the tray 128 in the axial direction of the stepped pin, engagement between the stepped pin and the elongated hole is canceled and the cap and the tray are split.

When the cap and the tray are split, cleaning turns out to be easy.

In the invention, it is preferable, from the viewpoint of making a cassette to be small, that the stepped pin is provided on the surface of the tray opposite to the surface where the radiographic image converter plate is provided.

As an example of providing an elongated hole, it is preferable that the cap is composed of a cap member which covers an opening of the case and shields the inside of the case against light and of a clip member which is provided on the cap member and is engaged with the opening of the case, and the elongated hole is provided on the guide plate which is provided on the clip member and is made to be almost in parallel with the tray when the cap is engaged with the opening of the case.

Figure 22:
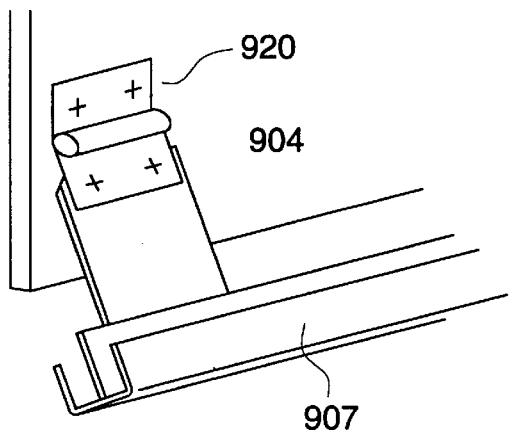
Figure 22:
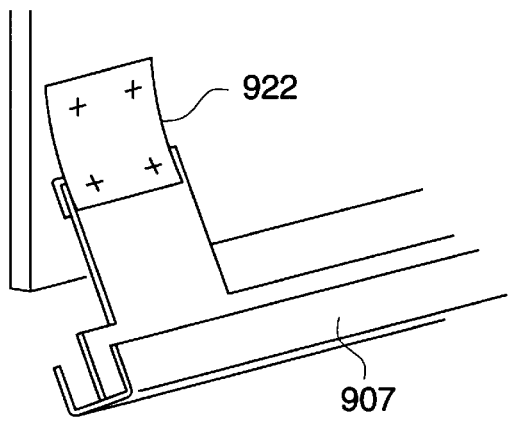
Figure 22:
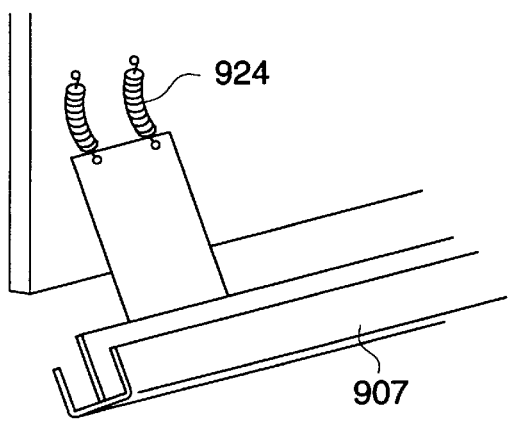

Each of FIGS. 22(*a*)–22(*c*) is a perspective view showing how a cap and a tray are mounted on a cassette in the third example of the invention.

Figure 23:
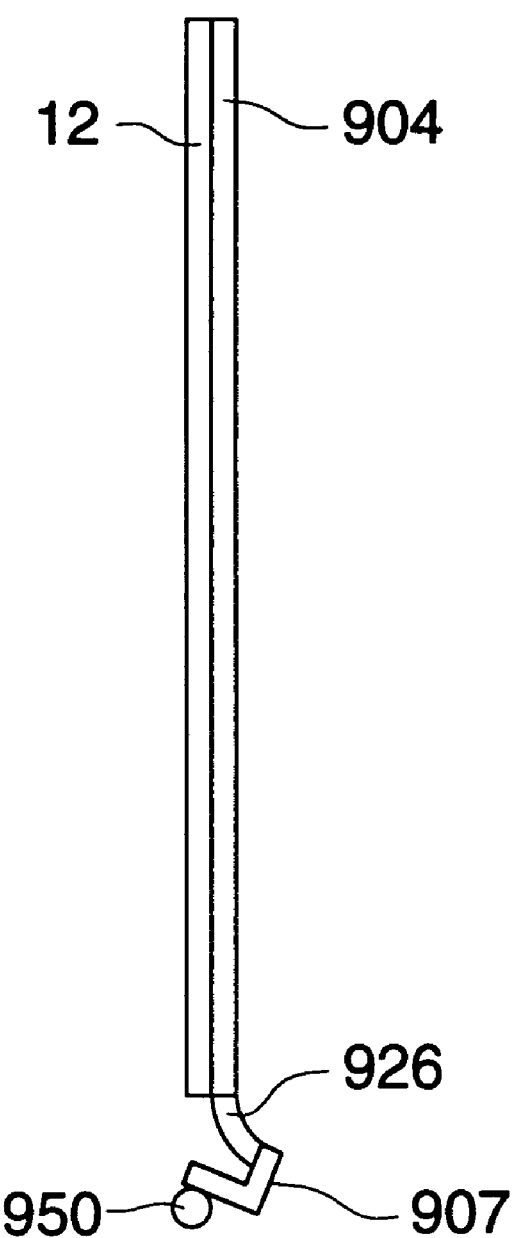

FIG. 23 is a sectional view showing a cap and a tray of a cassette in the fourth example of the invention.

Figure 24:
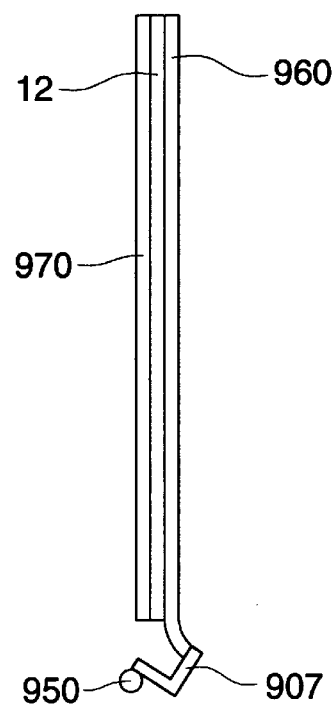
Figure 24:
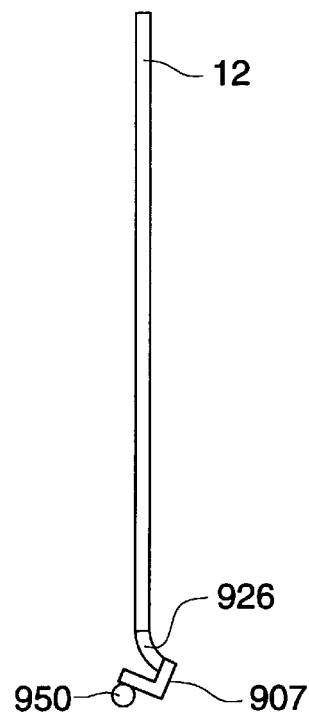

FIG. 24(*a*) is a sectional view showing a cap and a tray of a cassette in the fifth example of the invention.

FIG. 24(*b*) is a sectional view showing a cap and a tray of a cassette in the sixth example of the invention.

Figure 25:
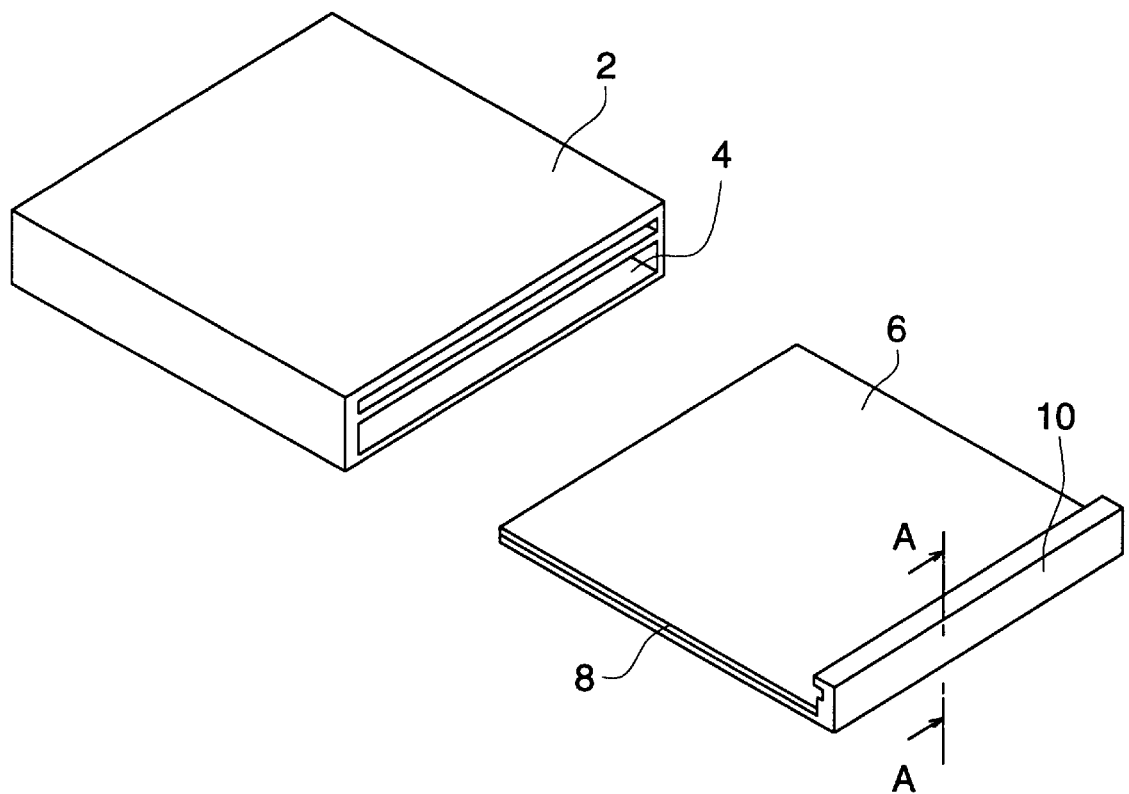

FIG. 25 is a perspective view illustrating a conventional cassette.

Figure 26:
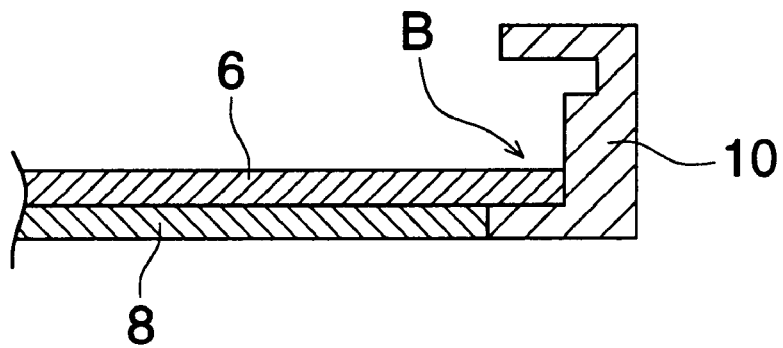

FIG. 26 is a sectional view taken on line A—A in FIG. 25.

Figure 27:
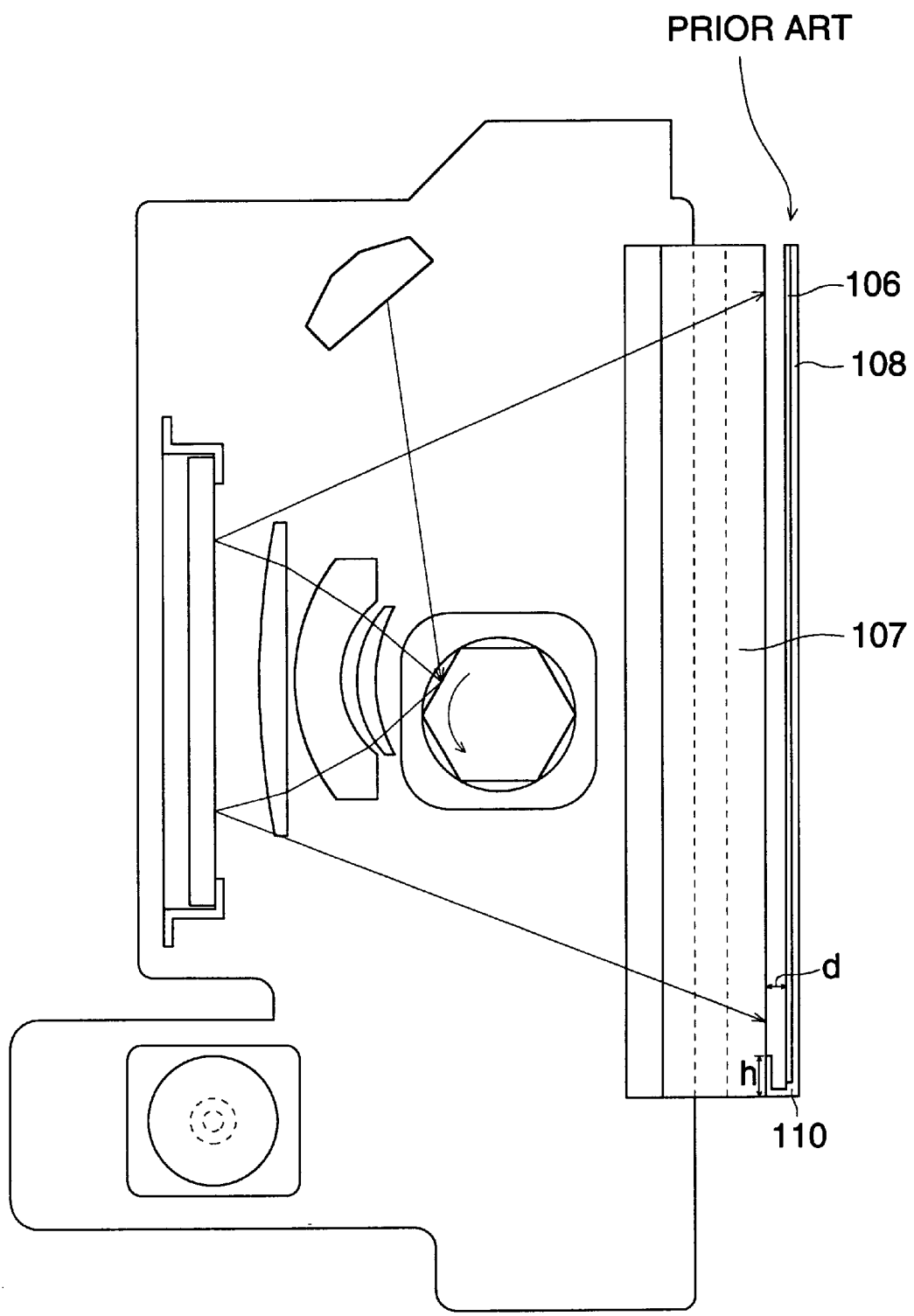

FIG. 27 is diagram illustrating the state of reading in the case where a conventional tray is used.

DETAILED DESCRIPTION OF THE PREFERRED EMBODIMENT

Figure 1:
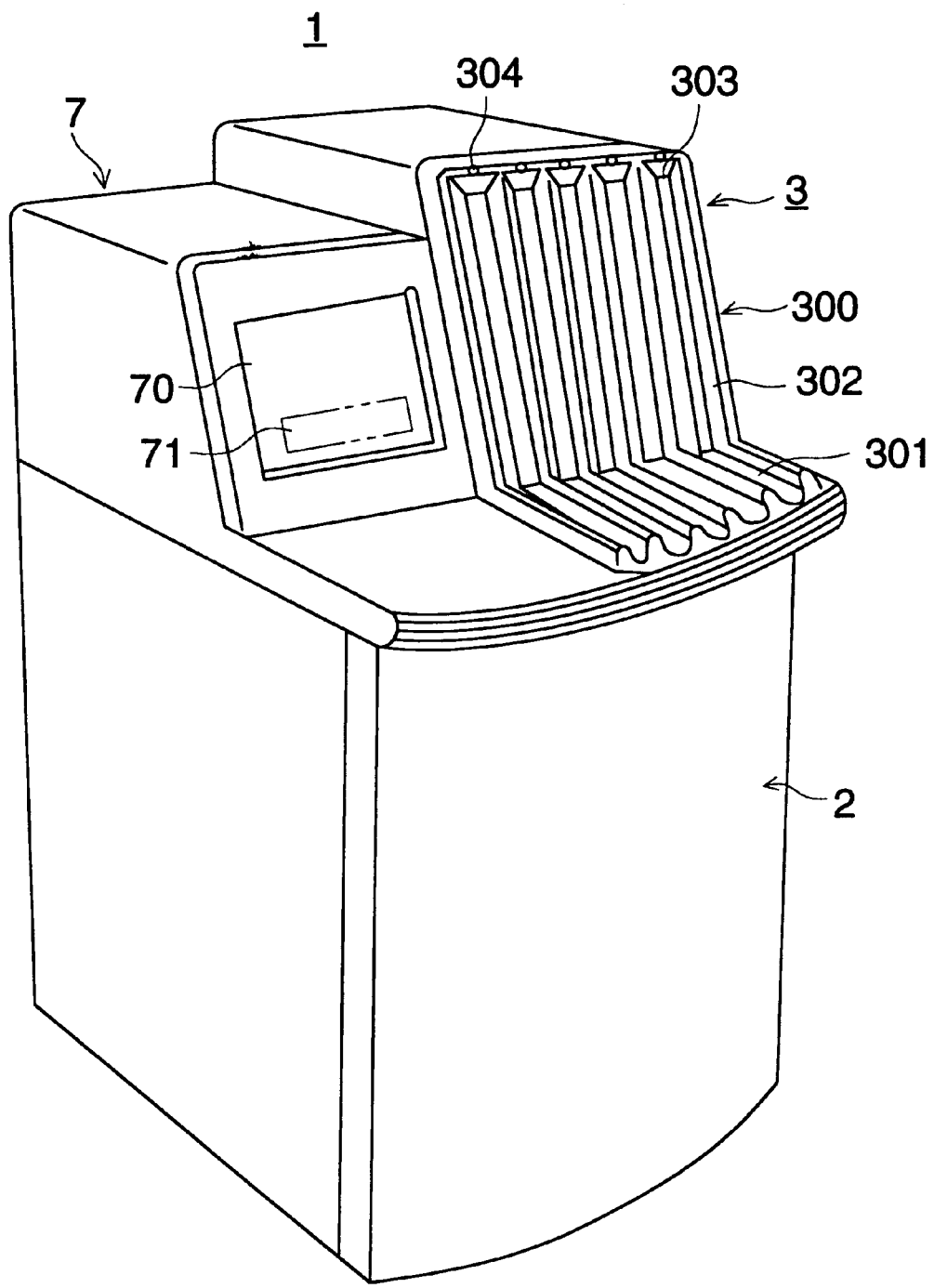
FIG. 1 is a perspective view of a radiographic image recording/reading apparatus wherein a cassette is not set.
Figure 2:
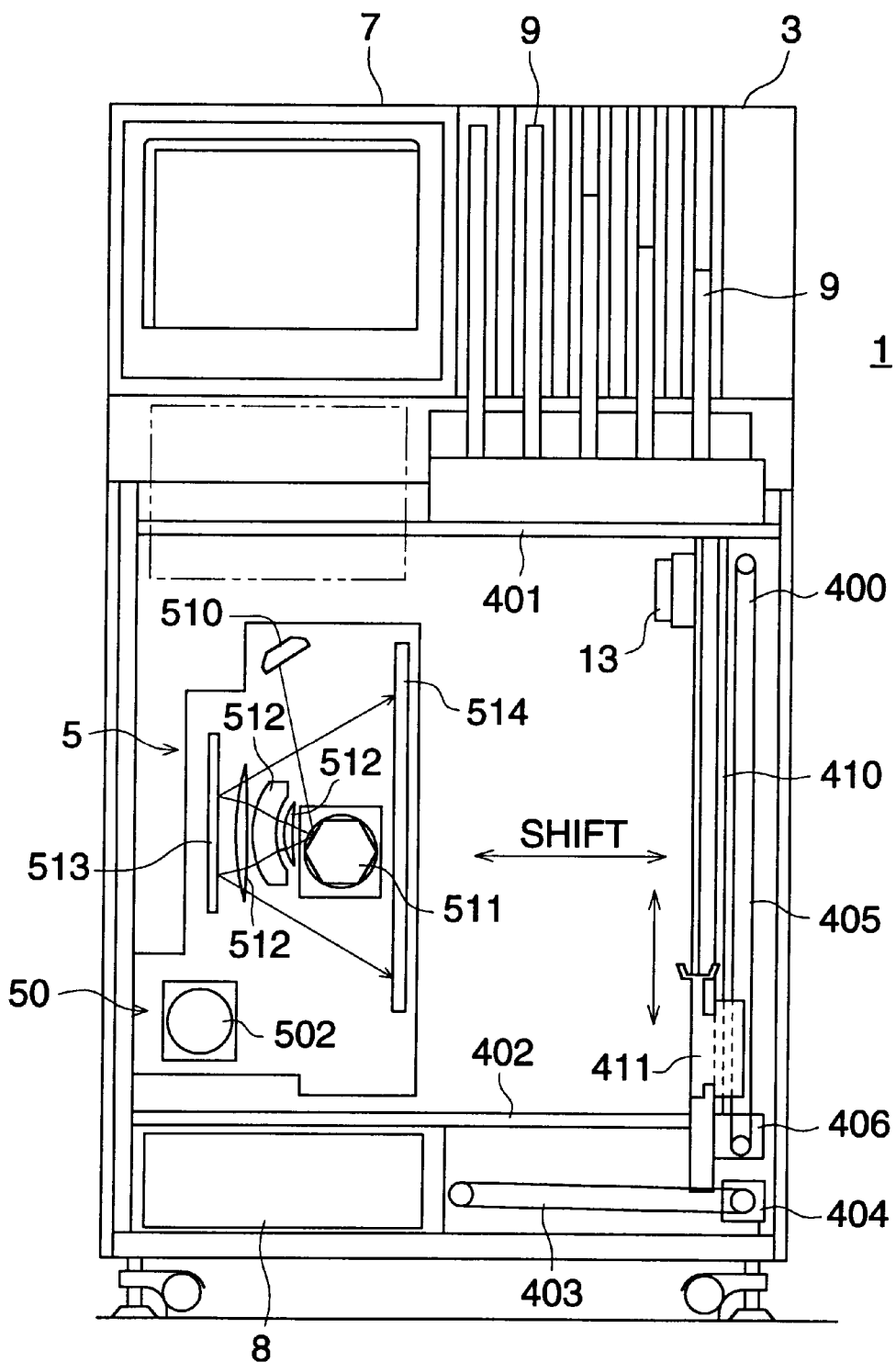
FIG. 2 is a front view of a radiographic image recording/reading apparatus wherein a cassette is set.
Figure 3:
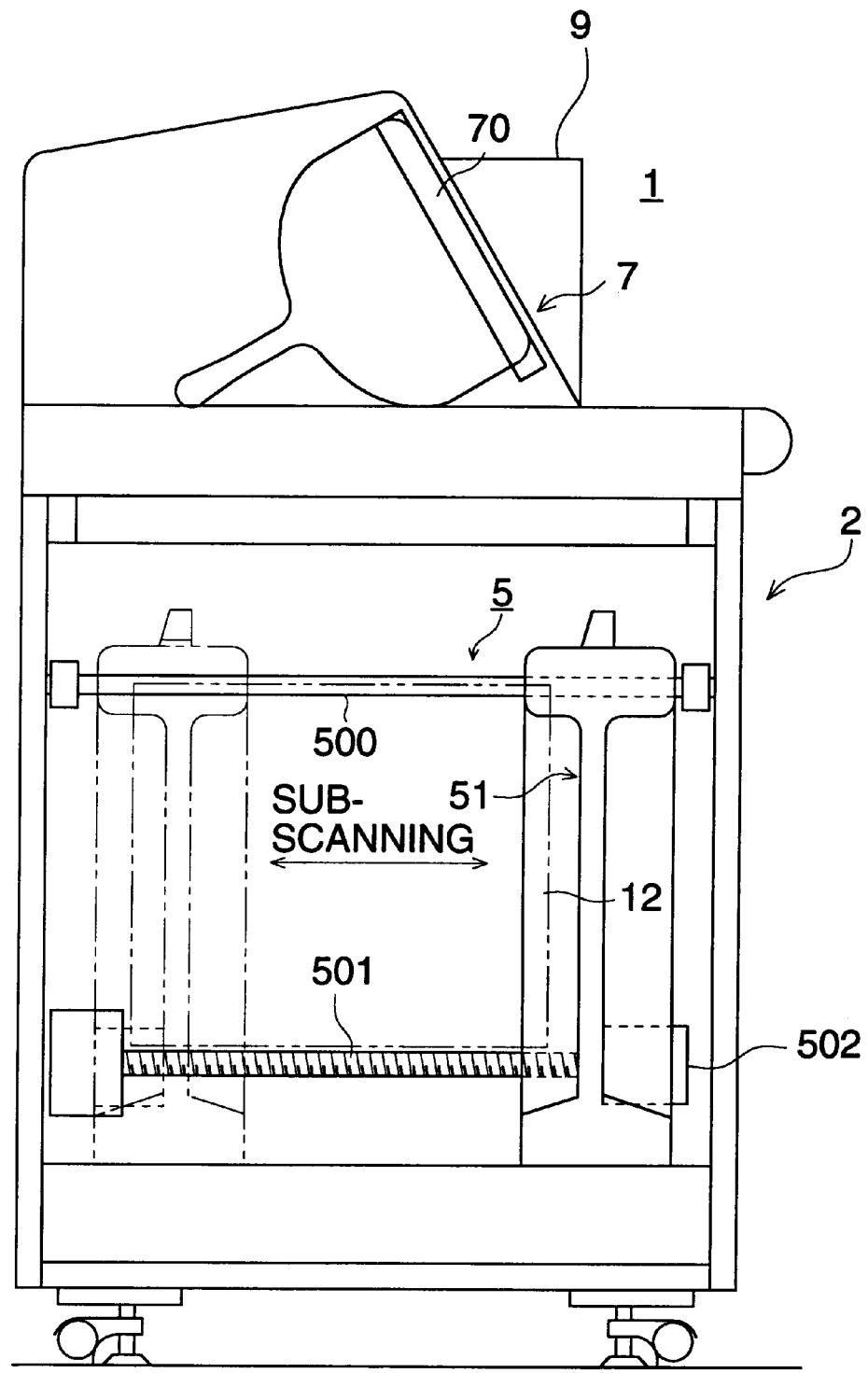
FIG. 3 is a side view on the left side in FIG. 2.
Figure 4:
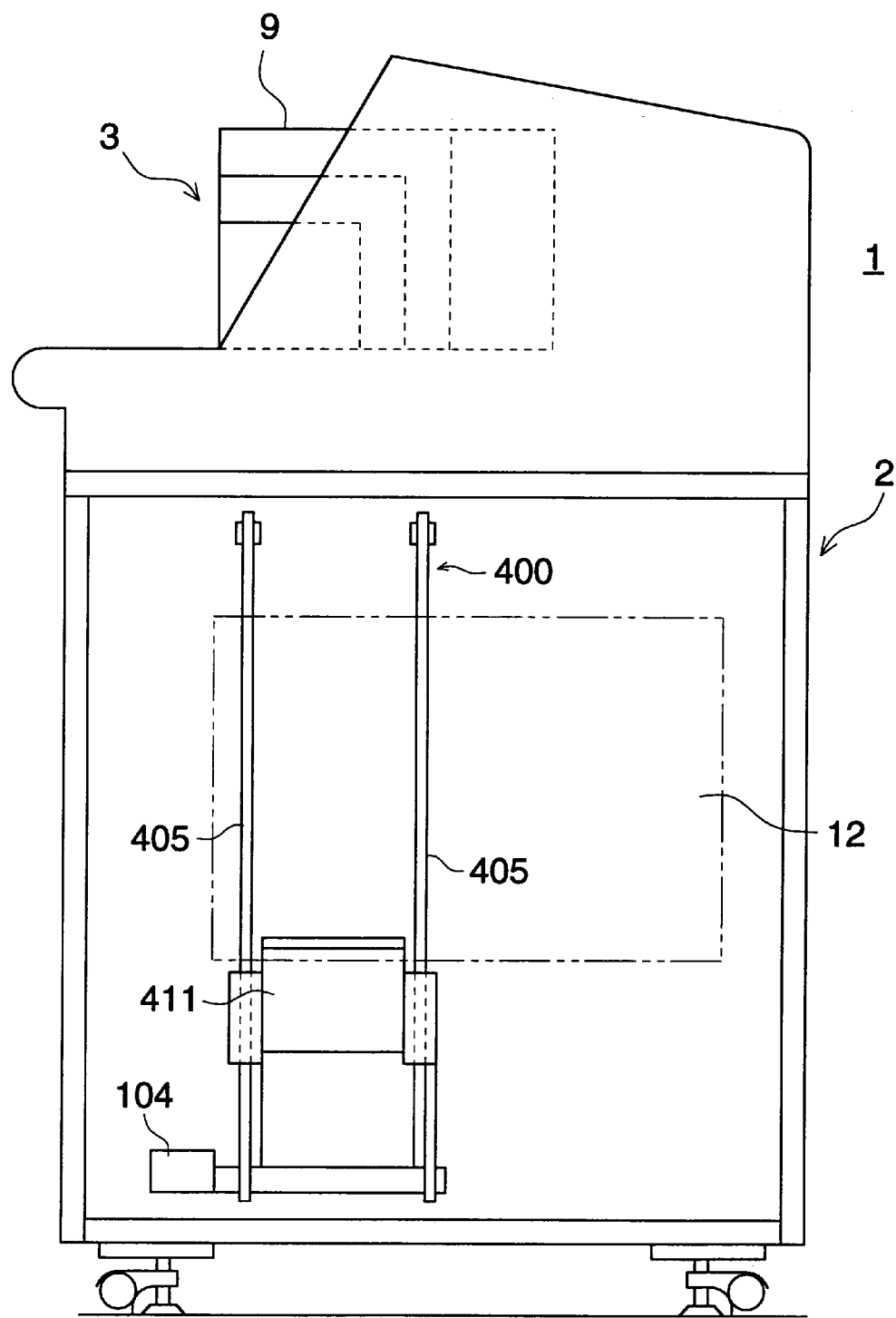
FIG. 4 is a side view on the right side of the radiographic image recording/reading apparatus in FIG. 2.

Outer shapes of a radiographic image recording/reading apparatus related to the invention will be explained. FIG. 1 is a perspective view of a radiographic image recording/reading apparatus wherein a cassette is not set, FIG. 2 is a front view of a radiographic image recording/reading apparatus wherein a cassette is set, FIG. 3 is a side view on the left side in FIG. 2, and FIG. 4 is a side view on the right side of the radiographic image recording/reading apparatus in FIG. 2.

Cassette stacker section 3 and display/operation section 7 are arranged side by side in the direction that is almost horizontal on the upper part of a radiographic image recording/reading apparatus. Namely, the cassette stacker section 3 is arranged at the right side on the upper part of radiographic image recording/reading apparatus 1, and the display/operation section 7 is arranged at the left side on the upper part of radiographic image recording/reading apparatus 1.

The cassette stacker section 3 has five insertion sections 300 each provided for each of five slots.

On the display/operation section 7, there are provide CRT 70 serving as a display section and touch panel 71 serving as an operation section provided on the display screen of CRT 70, and operations such as inspection reservation and patient registration, display/setting of the state of each section of the apparatus, and display of images read are conducted on the CRT 70.

CRT 70 to be used includes, for example, a 15-inch CRT (24-bit color, monochromatic 256 gradations·resolution 1024×768) in which operation input is conducted by means of touch panel 71 on CRT 70.

The touch panel 71 in the present embodiment is made to be of an optical system which responds to interception of light, for example, of infrared rays.

The insertion section 300 is composed of insertion guide section 301 and loading section 302. The insertion guide section 301 is groove-shaped and extends toward the loading section 302 to be formed so that cassette 9 may be guided toward the loading section 302 while keeping its vertical posture. In the loading section 302, there is loaded and held cassette 9 at prescribed intervals.

Cassette 9 is inserted lengthwise with this side of the apparatus serving as a reference, while keeping the longer side of the cassette to be in the horizontal direction, and simultaneously with completion of insertion of the cassette 9, light-intercepting shutter 303 is closed to prevent light leakage through the opening section.

Each cassette 9 can be taken out of each slot, and LED lamp 304 showing "in process of reading" is provided to avoid that the cassette 9 is taken out accidentally.

Cassette (First Example)

Next, cassette 9 used in radiographic image reading apparatus 1 will be explained in detail.

Figure 5:
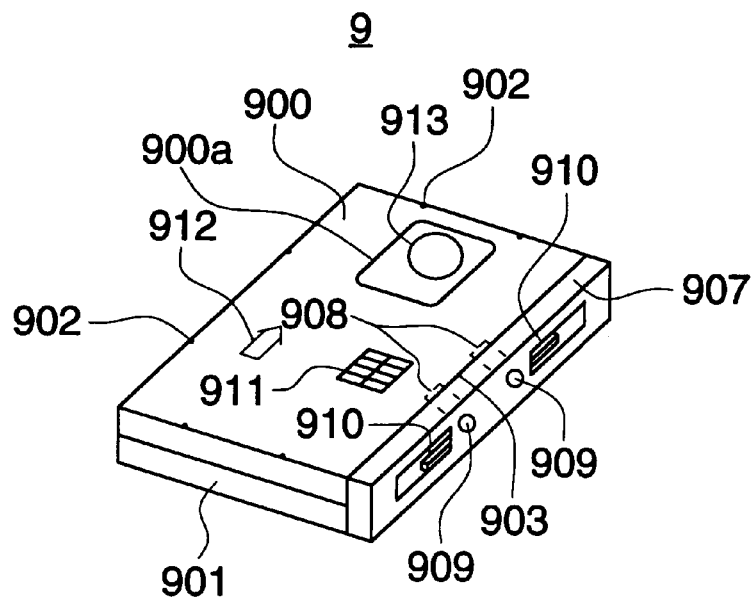
FIG. 5 is a perspective view showing the state wherein a radiographic image conversion plate is loaded in a cassette.
Figure 6:
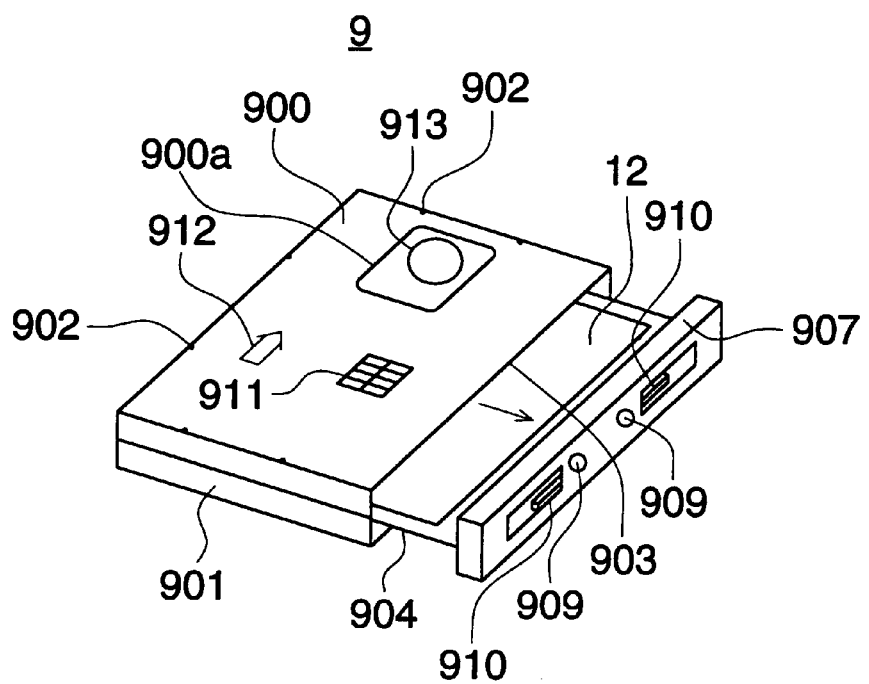
FIG. 6 is a perspective view showing the state wherein a radiographic image conversion plate is drawn out of a cassette.
Figure 7:
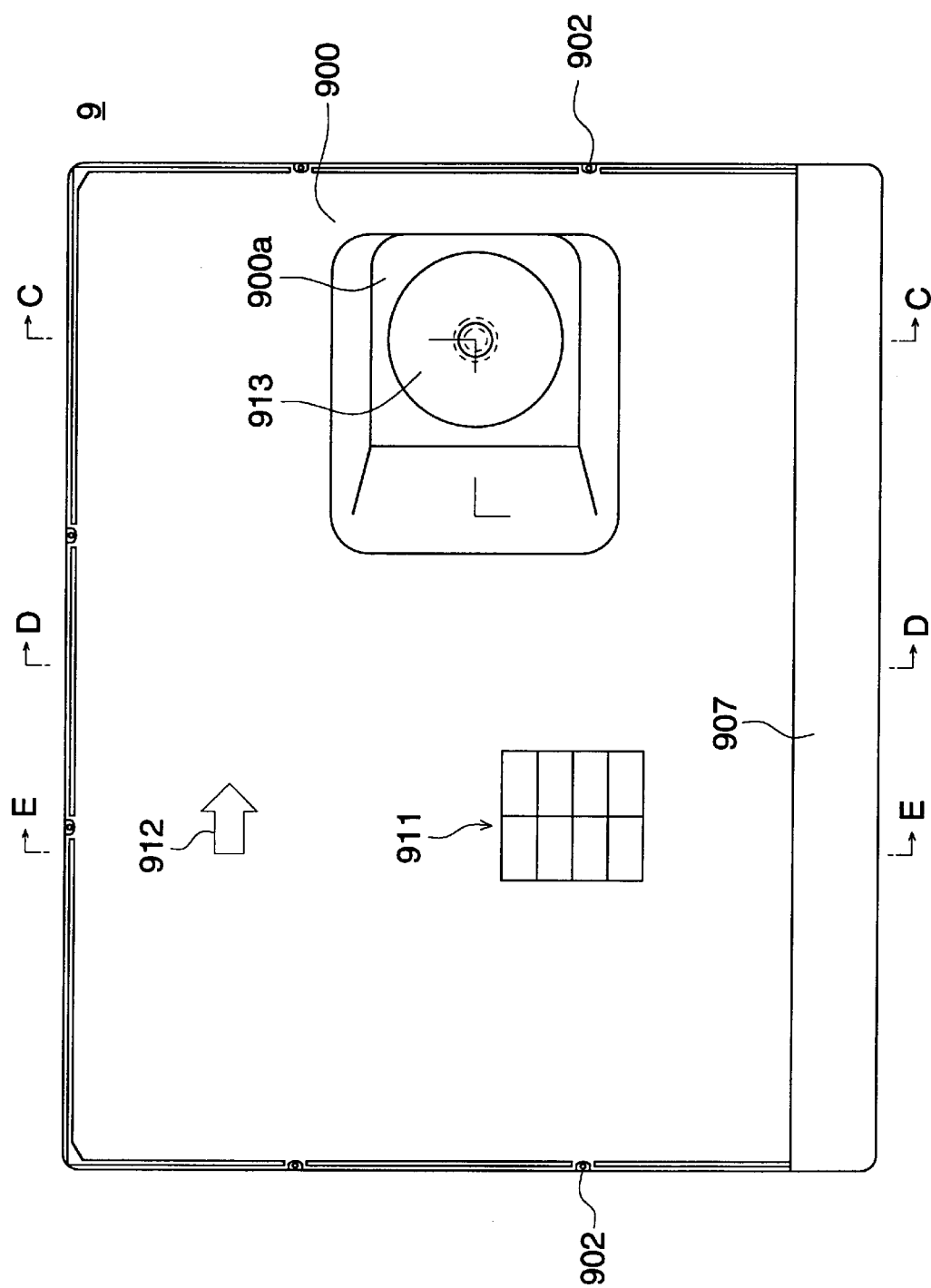
FIG. 7 is a top view of a cassette.
Figure 8:
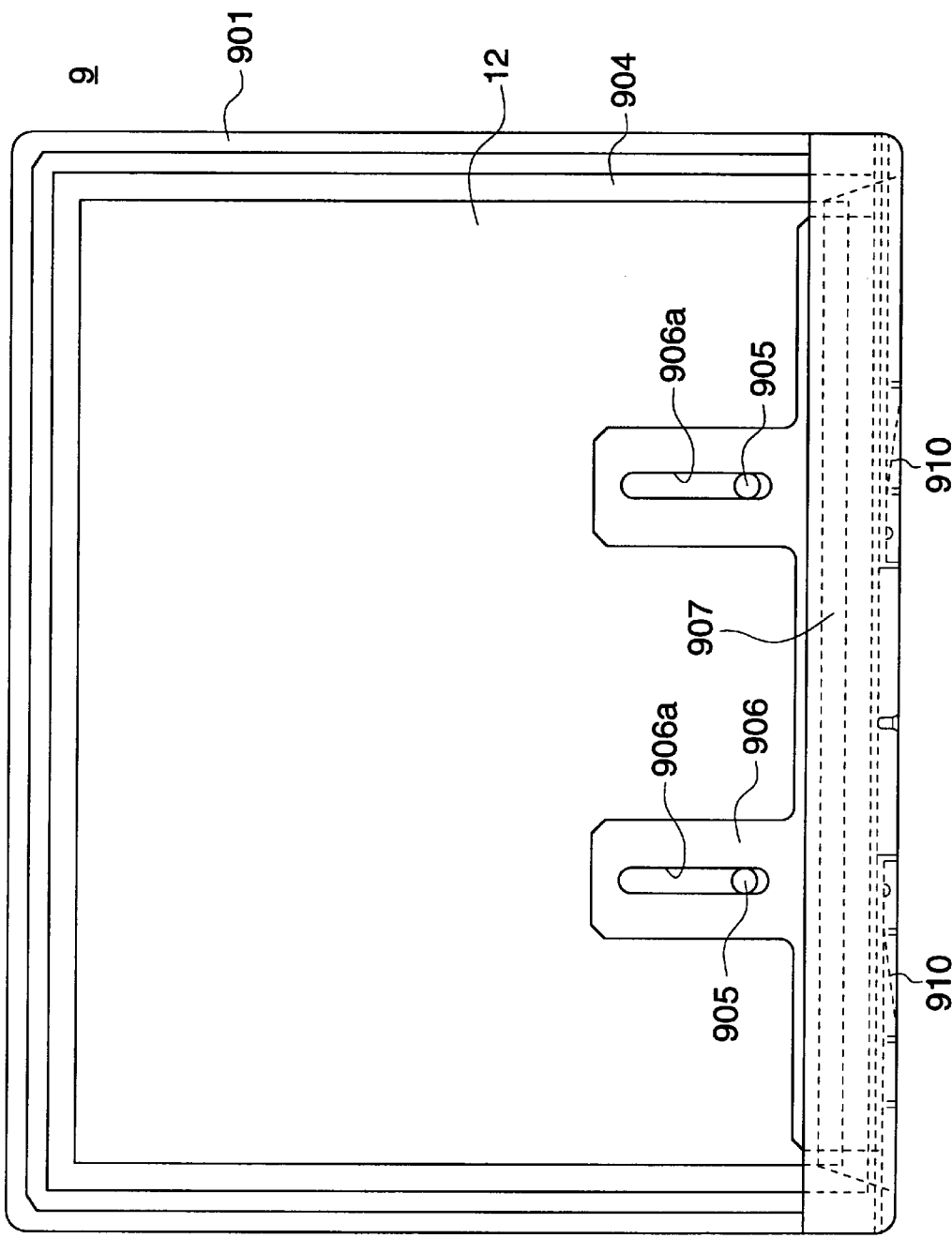
FIG. 8 is a top view showing the state wherein a radiographic image conversion plate is loaded in a cassette.

A cassette in the first example of the invention containing therein a radiographic image conversion plate is structured as shown in FIG. 5–FIG. 8, wherein FIG. 5 is a perspective view showing how a radiographic image conversion plate is loaded in the cassette, FIG. 6 is a perspective view showing the state wherein the radiographic image conversion plate is drawn out of the cassette, FIG. 7 is a plan view of the cassette, and FIG. 8 is a plan view showing how the radiographic image conversion plate is loaded in the cassette.

Cassette 9 is composed of case halves 900 and 901 which are united solidly with their peripheral portions clamped with machine screws 902. On one side portion of the cassette 9, there is formed opening 903 through which radiographic image conversion plate 12 can be drawn out.

The radiographic image conversion plate 12 has a stimulating phosphor layer, and the stimulating phosphor layer accumulates energy in accordance with radiation transmissivity distribution of a subject for a quantity of radiation irradiated from a radiation generating source, and thereby forms a latent image. On the radiographic image conversion plate 12, a stimulating phosphor layer is provided through gas phase sedimentation or coating. The stimulating phosphor layer is shielded or covered by a protecting member so that the stimulating phosphor layer may be shielded against an adverse effect caused by environmental conditions or against damage. Examples of the material of the radiographic image conversion plate used include;

alkaline halide phosphor represented by

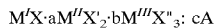

$$M^I X \cdot aM^{II} X'_2 \cdot bM^{III} X''_3 : cA$$

(wherein, $M^I$ is at least one kind of an alkali metal selected from Li, Na, K, Rb and Cs, $M^{II}$ is at least one kind of a divalent metal selected from Be, Mg, Ca, Sr, Ba, Zn, Cd, Cu and Ni, $M^{III}$ is at least one kind of halogen selected from Sc, Y, La, Ce, Pr, Nd, Pm, Sm, Eu, Gd, Tb, Dy, Ho, Er, Tm, Yb, Lu, Al, Ga and In, X, X' and X" represent at least one kind of halogen, and X, X' and X" represent at least one kind of metal selected from Eu, Tb, Ce, Tm, Dy, Pr, Ho, Nd, Yb, Er, Gd, Lu, Sm, Y, Tl, Na, Ag, Cu and Mg, and a, b and c satisfy respectively $0 \leq a \leq 0.5$, $0 \leq b < 0.5$ and $0 < c \leq 0.2$), or, alkaline earth metal fluorohalide phosphor expressed with

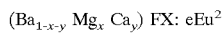

$$(Ba_{1-x-y} Mg_x Ca_y) FX : eEu^2$$

(wherein, X is one of Br and Cl, x, Y and e represent values satisfying respectively conditions of $0 < x+y < 0.6$, $xy \neq 0$ and $10^{-6} \leq e \leq 5 \times 10^{-2}$), or, a phosphor expressed with phosphor BaBr: $Eu^{2+}$ represented by BaFX: xCe, yA (wherein, X is at least one of ClBr and I, A is at least one of ln, Tl, Gd, Sm and Zn, and x and y represent respectively $0 < x \leq 2 \times 10^{-1}$ and $0 < y < 5 \times 10^{-2}$.)

The radiographic image conversion plate 12 is fixed on a rigid tray 904 located inside cassette 9, a pair of engagement pins 905 are provided on the tray 904 corresponding to the portion other than an area where images are recorded, and these paired engagement pins 905 are penetrating through the storage phosphor plate 12. For the paired engagement pins 905, there are slidably provided guide holes 906a of guide plate 906, and cap 907 which covers openings is provided on the guide plate 906.

Locking mechanism 908 is built in the cap 907, and locking by the locking mechanism 908 can be canceled through locking hole 909. Further, on the cap 907, there are provided a pair of levers 910, and these paired levers 910 open and close the cap 907 so that radiographic image conversion plate 12 is drawn out of or loaded in the cassette 9.

Types and sizes of cassette 9 are shown in Table 1.

TABLE 1

| Cassette Types | Cassette size (mm) Height × Depth |
|---|---|
| 14 × 17 in. (345 × 430 mm size) | 383.5 × 459.5 |
| 14 × 14 in. (345 × 345 mm size) | 383.5 × 383.5 |
| 10 × 12 in. (254 × 305 mm size) | 281.5 × 332.5 |
| 8 × 10 in. (200 × 251 mm size) | 230.5 × 281.5 |
| 24 × 30 | 267.5 × 327.5 |
| 18 × 24 in. for mammography use | 194.5 × 267.5 |

On cassette 9, there is pasted identification seal 911 on which identification information of black and white is recorded. Through detection of the identification information on the identification seal 911, types and sizes of cassette 9 are detected, and erroneous loading in cassette stacker 3 is detected.

The direction for inserting cassette 9 as well as the obverse side and the reverse side are judged by means of the identification seal 911.

Though indication of upper and lower grid direction of cassette 9 depends on indication mark 912 for the upper or lower direction, it is also possible to arrange so that the upper or lower direction can be designated by loading the cassette 9 in the cassette stacker 3 with cap 907 facing downward.

On the cassette 9, there is provided diagnosis record clip 913 on case half 900, and around the diagnosis record clip 913, there is formed recessed portion 900a on the case half 900, and diagnosis records are held between the recessed portion 900a and the diagnosis record clip 913.

Plate Conveyance Section

Figure 9:
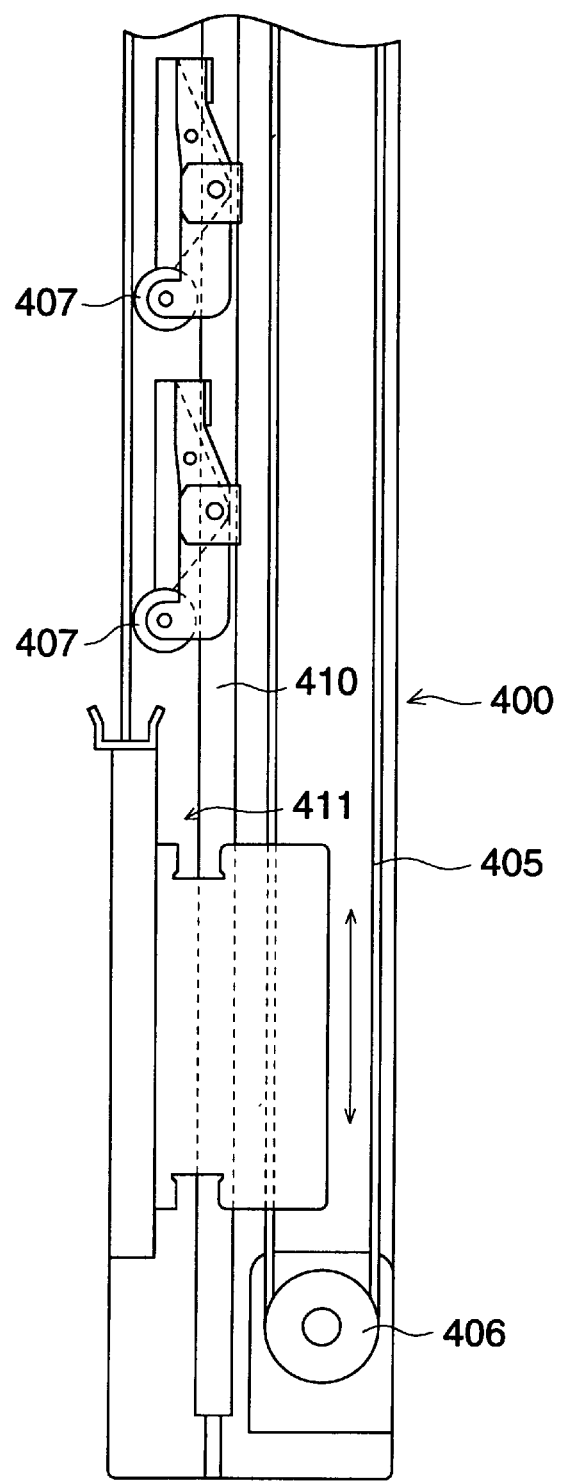
FIG. 9 is a front view showing the structure of a plate conveyance section.
Figure 10:
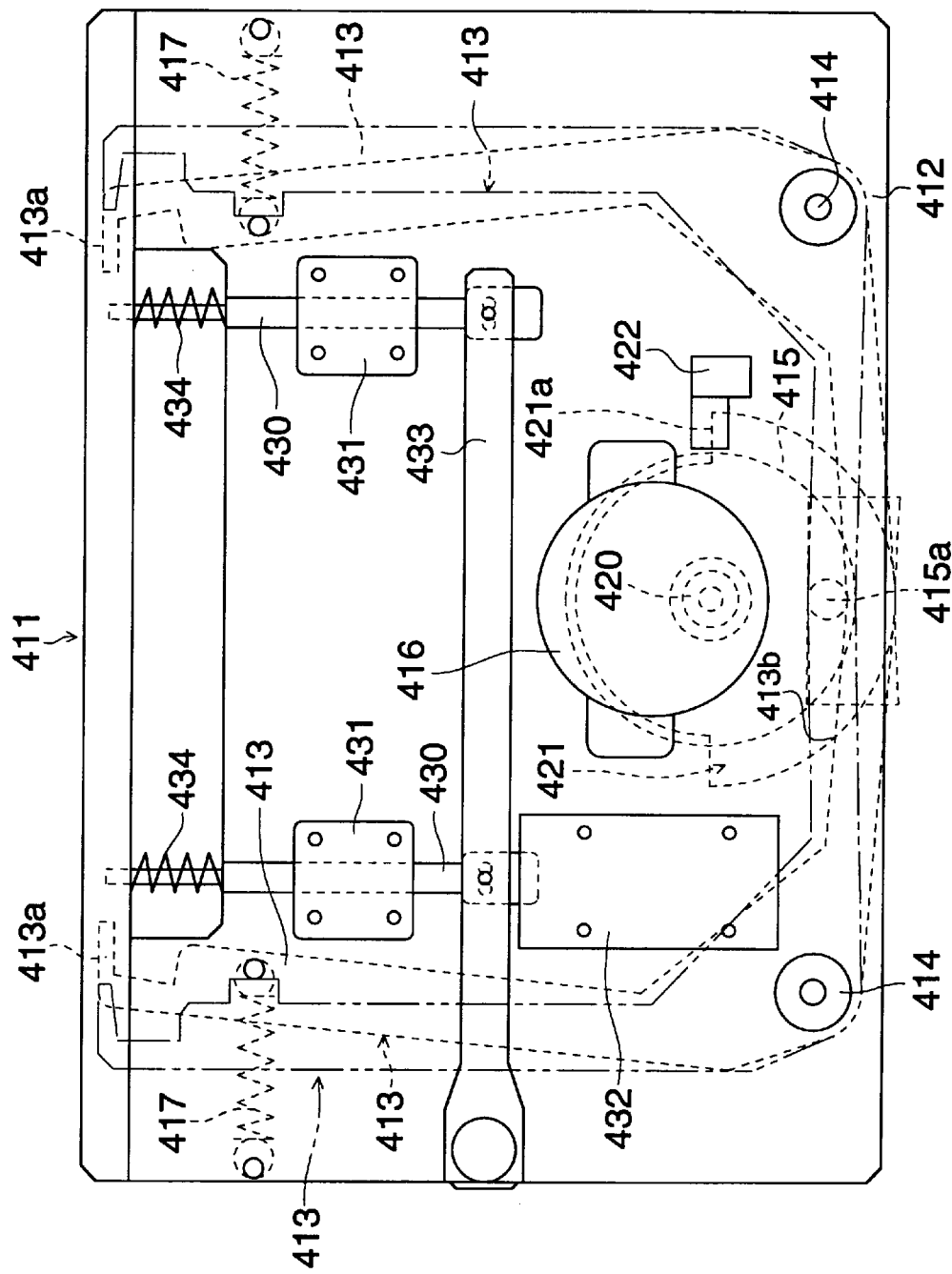
FIG. 10 is a side view of a cassette clinch in FIG. 15.
Figure 11:
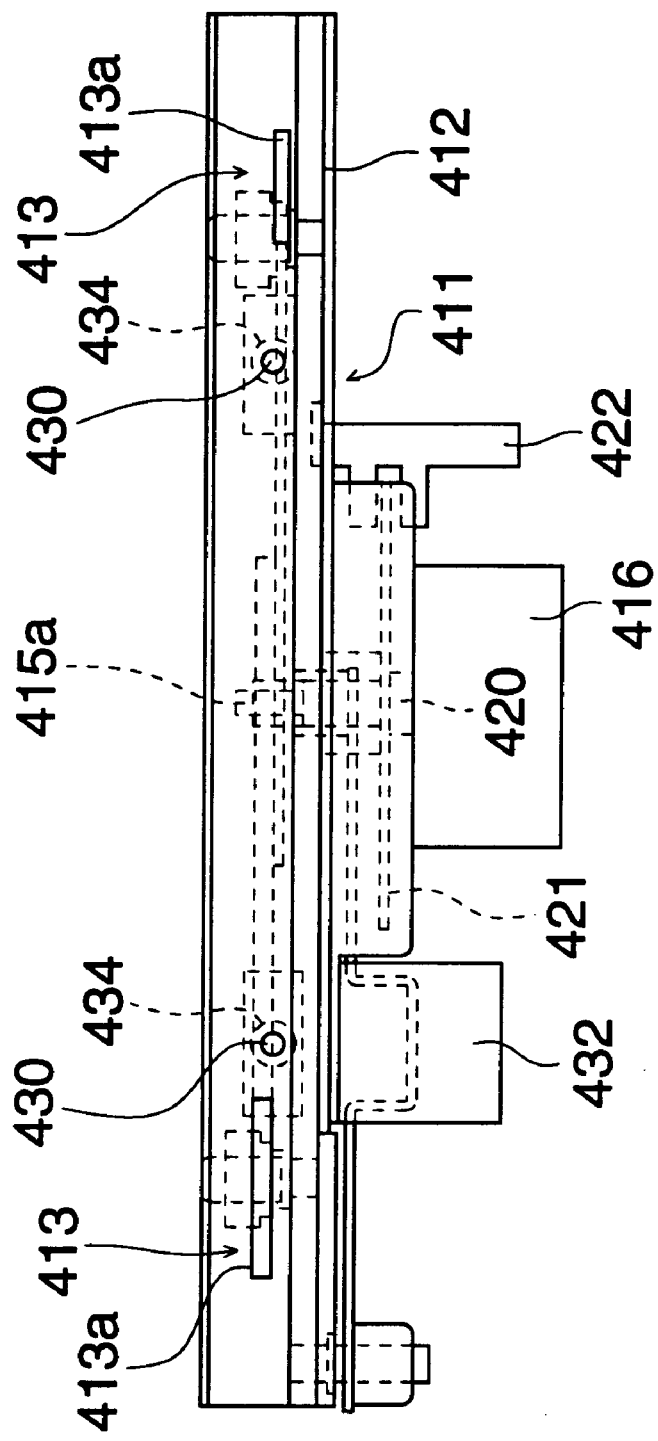
FIG. 11 is a top view of a cassette clinch.

FIG. 9 is a front view showing the structure of a plate conveyance section, FIG. 10 is a side view of a cassette clinch in FIG. 9, and FIG. 11 is a top view of the cassette clinch.

Plate conveyance section 4 is apparatus main body 2 of radiographic image recording/reading apparatus 1 and it is arranged at the lower part of cassette stacker section 3 and conducts conveyance of radiographic image conversion plate 12 between sub-scanning section 50 and a cassette position in cassette stacker section 3.

Plate conveyance section mechanism • driving section 40 provided on plate conveyance section 4 is structured as shown in FIG. 2 and FIG. 9–FIG. 11.

Namely, the plate conveyance section mechanism • driving section 40 is supported on guide rails 401 and 402 each being provided on its upper and lower portions with supporting frame 400. These guide rails 401 and 402 are arranged in the direction perpendicular to cassette 9 loaded in cassette stacker 3. A lower end portion of the supporting frame 400 is fixed to conveyance belt 403 which is arranged at the lower portion, and the conveyance belt 403 is driven by conveyance motor 404, whereby the supporting frame 400 moves along the guide rails 401 and 402.

On the upper portion of the supporting frame 400, there is attached erasing section 13. As an erasing light source of the erasing section 13, two 300-watt halogen lamps (driving voltage: 90 V), for example, are used, and the moving speed of radiographic image conversion plate 12 in the course of erasing is 10.5 mm/sec which, however, is variable depending on image recording on the radiographic image conversion plate 12. The halogen lamp is an erasing light source which is lit to project erasing light on the radiographic image conversion plate 12 to erase residual images. This erasing of residual images is projecting erasing light on the radiographic image conversion plate 12, and it means scanning by a laser beam and discharging of residual radiation energy on the storage phosphor plate 12 after reading.

On the supporting frame 400, there is provided guide shaft 410 vertically, and cassette clinch 411 is mounted on the guide shaft 410 to be movable vertically. The cassette clinch 411 is attached to conveyance belt 405 arranged vertically, and the conveyance belt 405 is driven by conveyance motor 406 arranged at the lower position of the supporting frame 400, thus, the cassette clinch 411 moves vertically along the guide shaft 410. Further, on the supporting frame 400, there is provided holding roller 407 which prevents the radiographic image conversion plate 12 from falling and holds an end portion outside an image recording area on the radiographic image conversion plate 12.

On the cassette clinch 411, there are provided, inside supporting member 412, a pair of arms 413 each being capable of rotating around supporting pin 414 which serves as a fulcrum as shown in FIG. 10. Claw sections 413*a* provided on tips of the paired arms 413 are capable of engaging with a pair of levers 910 provided on cap 907 of cassette 9, while the paired arms 413 are urged respectively by springs 417 so that base portions 413*b* may constantly be in contact with pin 415*a* on cam 415.

The cam 415 is rotated by driving motor 416. When the cam 415 is rotated, pin 415*a* presses the base portions 413*b* and the paired arms 413 are opened and closed accordingly.

On rotary shaft 420 of the driving motor 416, there is provided rotary disk 421, and the number of rotations of the driving motor 416 is detected by the timing with which cut-out 421*a* formed on the rotary disk 421 traverses photocoupler 422, to control opening and closing of the paired arms 413.

On the supporting member 412 of the cassette clinch 411, there are provided a pair of lock-releasing rods 430 which release the lock by locking mechanism 908 of cap 907. These paired lock-releasing rods 430 are supported by plate 431 on the supporting member 412 to be slidable, and solenoid 432 is linked with lock-releasing rod 430 on one side, and this lock-releasing rod 430 is linked with lock-releasing rod 430 on the other side through linking lever 433 so that both lock-releasing rods may interlock each other.

The paired lock-releasing rods 430 are constantly urged to the initial positions by springs 434, and when the supporting member 412 is brought into contact with cap 907 of cassette 9 at the position to which the cassette clinch 411 moves and solenoid 432 is moved, the paired lock-releasing rods 430 are projected and enter lock holes 909 to release the lock of lock-releasing mechanism 908.

Due to the lock release of the locking mechanism 908, the paired arms 413 are closed and claw sections 413a are engaged with a pair of levers 910 of cap 907. Under this state, the cassette clinch 411 is moved downward, radiographic image conversion plate 12 is drawn out of cassette 9, and supporting frame 400 is moved to be conveyed to image reading section 5 while holding the radiographic image conversion plate 12 which is drawn out to the cassette clinch 411.

After completion of image reading for the radiographic image conversion plate 12, the supporting frame 400 is moved to the opposite direction to be returned to the prescribed position, then, cassette clinch 411 is moved upward and the radiographic image conversion plate 12 is loaded in cassette 9. In this case, when the radiographic image conversion plate 12 is loaded in cassette 9 without operating the paired lock-releasing rods 430 and cap 907 is closed, the lock mechanism locks the cap 907 automatically.

Image Reading Section (1) Image reading section

Figure 12:
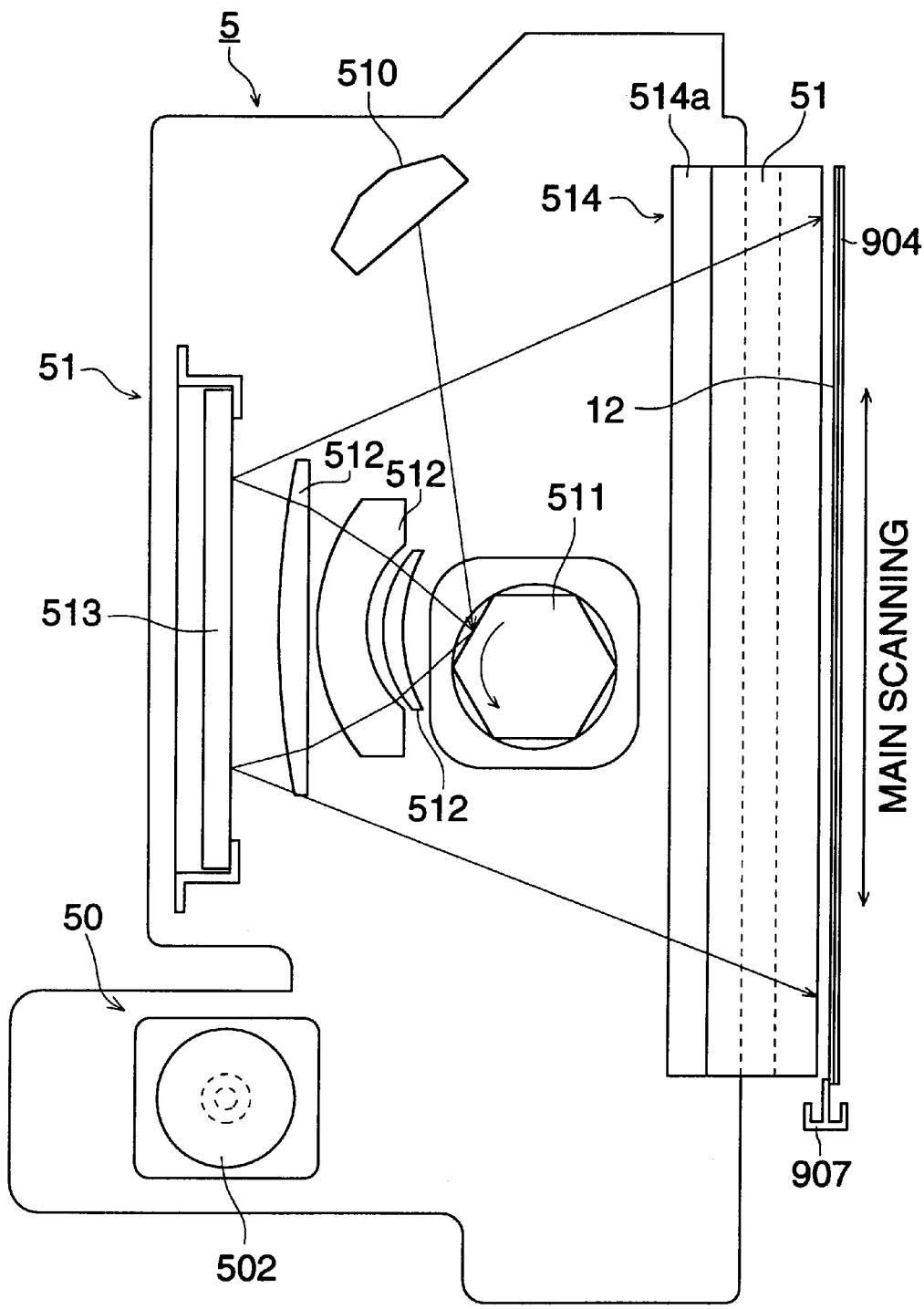
FIG. 12 is a diagram showing an optical system of an image reading section.

FIG. 12 is a diagram showing an optical system of image reading section 5.

The image reading section 5 is built in apparatus main body 2 of radiographic image recording/reading apparatus 1, and is arranged at the position below operation section 7.

As shown in FIG. 8, cap 907 is slidably mounted on tray 904 by means of guide hole 906*a* and pin 905 in the cassette of the invention. Therefore, tray 904 is arranged so that the cap 907 may be shifted downward and conversion plate 12 may come in close contact with photoreceptor section 514 of image reading section 5 as shown in FIG. 12, when a conversion plate is conveyed to image reading section 5 by a plate conveyance section. After that, non-image areas on both side portions of tray 904 are grasped by unillustrated grasping means, and radiographic images are read under the condition where the conversion plate 12 is fixed to the position shown in FIG. 12.

(2) Sub-scanning Section Mechanism • Driving Section

Sub-scanning section 50 provided on the image reading section 5 conveys main scanning section 51 in the sub-scanning direction.

In the sub-scanning section mechanism driving • section 50, guide shaft 500 in the direction facing the radiographic image conversion plate 12 and ball screw 501 are arranged to be in parallel with each other as shown in FIGS. 2, 3 and 12. The guide shaft 500 is positioned at the upper part and the ball screw 501 is positioned at the lower part, and main scanning section 51 is held vertically by the guide shaft 500 and the ball screw 501 to be movable horizontally.

On the ball screw 501, there is provided direct drive motor 502, and the ball screw 501 is driven by direct drive motor 502 to rotate and thereby to move the main scanning section 51 in the sub-scanning direction.

(3) Main Scanning

As shown in FIG. 12, the main scanning section 51 is composed of laser beam generating section 510, polygon mirror 511, fθ lens constituting converging object 512, reflecting mirror 513 and acceptance section 514 which are solidly structured. The laser beam generating section 510 has therein a gas laser solid-state laser or a semiconductor laser as a light source. As an excitation light, the laser beam generating section 510 generates a laser beam where in an emission intensity is forced.

A laser beam passes through an optical system and arrives at polygon mirror 511 where the laser beam is deflected, then is converged by fθ lens constituting converging object 512, and is deflected by reflecting mirror 513 in terms of optical path to be led to storage phosphor plate 12 as a scanning light for stimulating excitation. Then, image reading is conducted when stimulating emission generated by the radiographic image conversion plate 12 scanned by the aforesaid laser beam is accepted by the acceptance section 514. The acceptance section 514 is structured by long photomultiplier 514a and flat converging plate 514b.

A laser beam enters long photomultiplier 514a and is converted photoelectrically into electric signals corresponding to the incident light. Namely, the stimulating emission passes through flat converging plate 514b and enters long photomultiplier 514a to be converted photoelectrically. Therefore, output current corresponding to radiographic images can be obtained. The output current from the long photomultiplier 514a is converted into voltage signals by an unillustrated current/voltage converter and then is converted into digital image signals by A/D converter after amplified by an unillustrated amplifier. Then, digital image signals are outputted successively to the image processing circuit where various image processing including gradation processing are conducted, and then, the signals are stored in the image disk as they are, or visualized by CRT 70.

The reading section control image input control section 61 is arranged so that various kinds of synchronization signals coming from polygon mirror 511 and detection signals for the starting position coming from a photosensor (not shown) which detects the starting position of sub-scanning may be inputted in the reading control section, and main scanning section 51 is moved from the starting position at the prescribed speed in the sub-scanning direction, while being synchronized with the main scanning made by the polygon mirror 511.

The present embodiment employs a system of incidence which is almost vertical in which an incidence angle for irradiation on radiographic image conversion plate 12 is 5 degrees to the surface of the radiographic image conversion plate 12.

Reading Cycle Time (feed/load time) and Processing Capacity

The feed/load time of the radiographic image reading apparatus 1 is defined to be a period of time from the moment when cassette 9 is loaded in cassette stacker 3 to start reading up to the moment when the cassette is ready to be drawn out (175 μm reading). When the mode is a sleep mode, approximately 10 seconds are added. Further, when the maximum amount of arriving radiation on the radiographic image conversion plate 12 exceeds 20 mR, a maximum of 18 seconds is added.

Processing capacity of the radiographic image reading apparatus 1 is defined to be the number of processed sheets per one hour in the case where cassettes 9 are loaded in loading section 300 in regular sequence starting from slot No. 1.

Image Reading

Image reading conducted by image reading section 5 of the radiographic image recording/reading apparatus 1 will be explained in detail as follows.

(1) Matrix Size, Reading Area

In the first place, reading areas and matrix sizes in each cassette are shown in Table 2.

TABLE 2

| Cassette Types | Reading areas |
| --- | --- |
| 14 × 17 in. (345 × 430 mm size) | 353.0 × 429.0 |
| 14 × 14 in. (345 × 345 mm size) | 353.0 × 353.0 |

TABLE 2-continued

| Cassette Types | Reading areas |
| --- | --- |
| 10 × 12 in. (254 × 305 mm size) | 251.0 × 302.0 |
| 8 × 10 in. (200 × 251 mm size) | 200.0 × 251.0 |
| 24 × 30 | 237.0 × 297.0 |
| 18 × 24 in. for mammography use | 177.0 × 237.0 |

(2) Radiographing Sensitivity

With regard to film speed on the image reading section 5, it is possible to establish the film speed in the following three steps for each region.

Namely, the film speed includes low speed (s=equivalent to 50–200) standard speed (s=equivalent to 200–1000) and high speed (s=equivalent to 1000–5000), and values represented by s are defined to be the values wherein photomultiplier tube (PMT) sensitivities are relatively expressed under the condition of the standard of the PMT sensitivity of s=200 which corresponds to output of a digital value of 1535 for X-ray irradiation of $2.58 \times 10^{-7}$ CKg (1 mR).

(3) Grid Moire Removal

When a grid is arranged in the direction designated by the marks showing the upper and lower sides of a cassette, a moire can be removed, and grids respectively of 34, 40, 60 and 80 lines/cm, for example, are used as a grid to be used.

(4) Irregularity Correction

Contents of correction made by the image reading section 5 are corrections for irregularity in the main scanning direction on an apparatus (S), irregularity in the longitudinal direction (F) and irregularity in polygon (P).

As correction data, there are maintained data in two types of parameters of 87.5/175 μm for each content of correction.

As stated above, cap 907 is mounted on tray 904 slidably in the cassette of the invention. It is therefore easy to clean the vicinity of the base portion of the cap. It is further possible to prevent a decline of reading accuracy for radiographic images, because the converter plate is arranged to come in close contact with a photoreceptor section of an image reading section. It is further possible to prevent that an image area is narrowed, because a cap can be shifted downward.

Cassette Example 2

Figure 13:
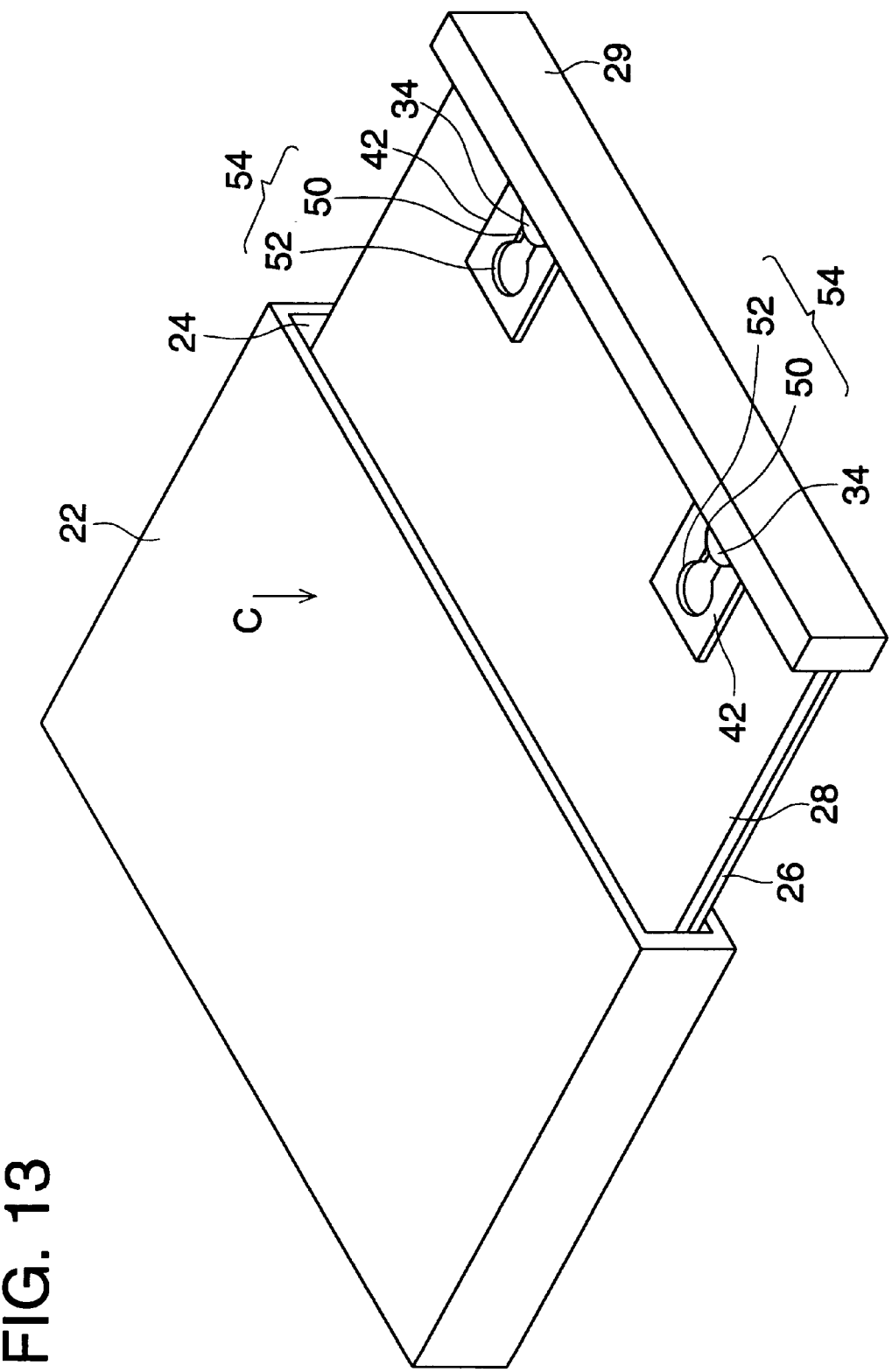
FIG. 13 is a perspective view of a cassette in the second example of the invention.

Overall structure of the present embodiment will be explained with reference to FIGS. 13 and 14, first.

On case 22, there is formed opening 24 whose one side is open.

On the other hand, radiographic image conversion plate 26 which is flexible is fixed on tray 28 having sufficient rigidity, and is arranged in the case 22 through the opening 24 of the case 22.

Further, on the tray 28, there is detachably provided cap 29 which engages with the opening 24 of the case 22 and shields the inside of the case 22 optically.

Figure 14:
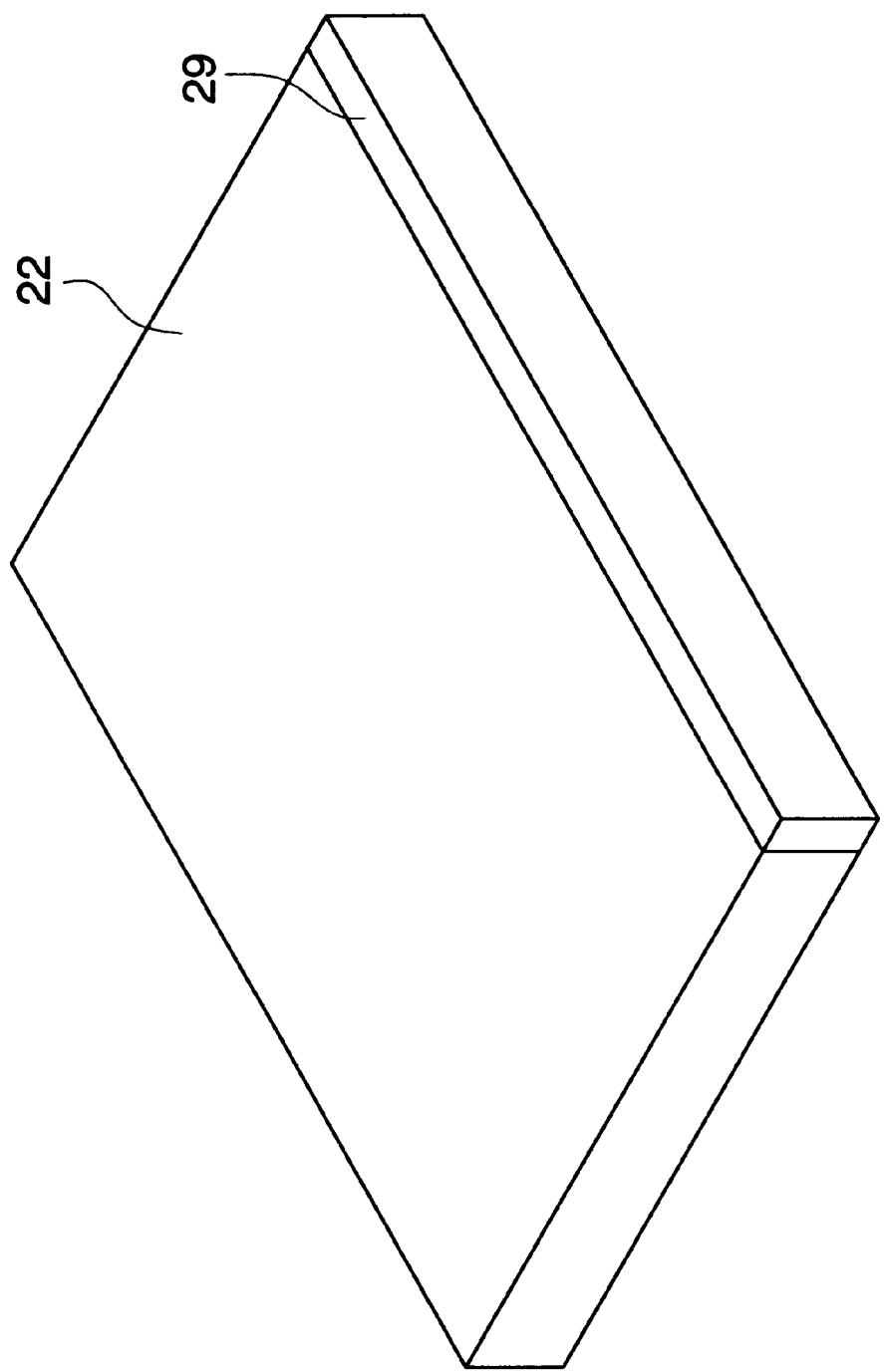
FIG. 14 is a perspective view showing the state wherein a tray in FIG. 13 is completely loaded in a case.

Therefore, when the cap 29 inserts the tray 28 which is in engagement into the case 22 through opening 24 of the case 22, the cap 29 is engaged with the opening 24 of the case 2 and the inside of the case 22 is shielded optically as shown in FIG. 14, accordingly.

Figure 15:
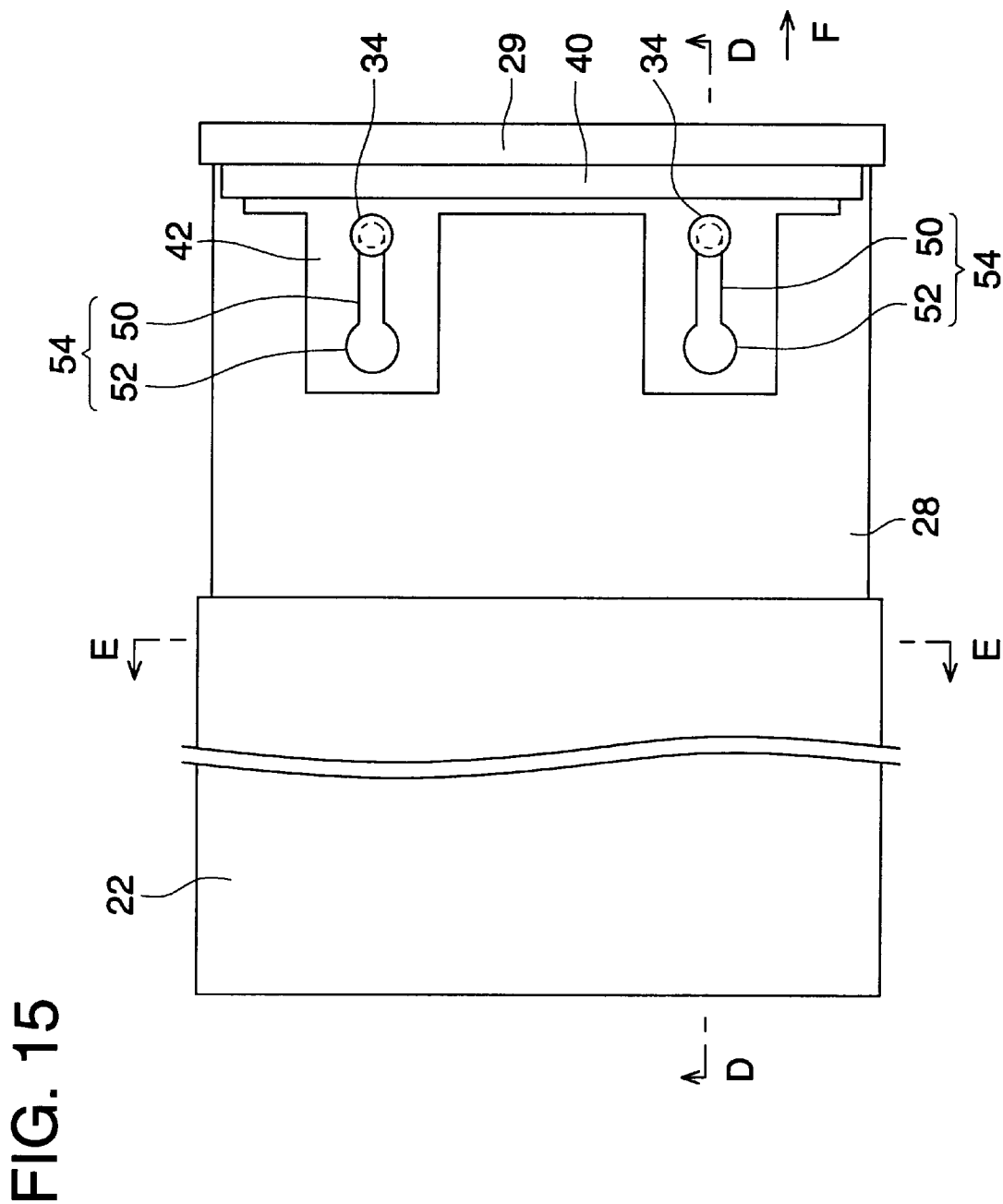
FIG. 15 is a diagram viewed in the direction of arrow mark C in FIG. 13.
Figure 16:
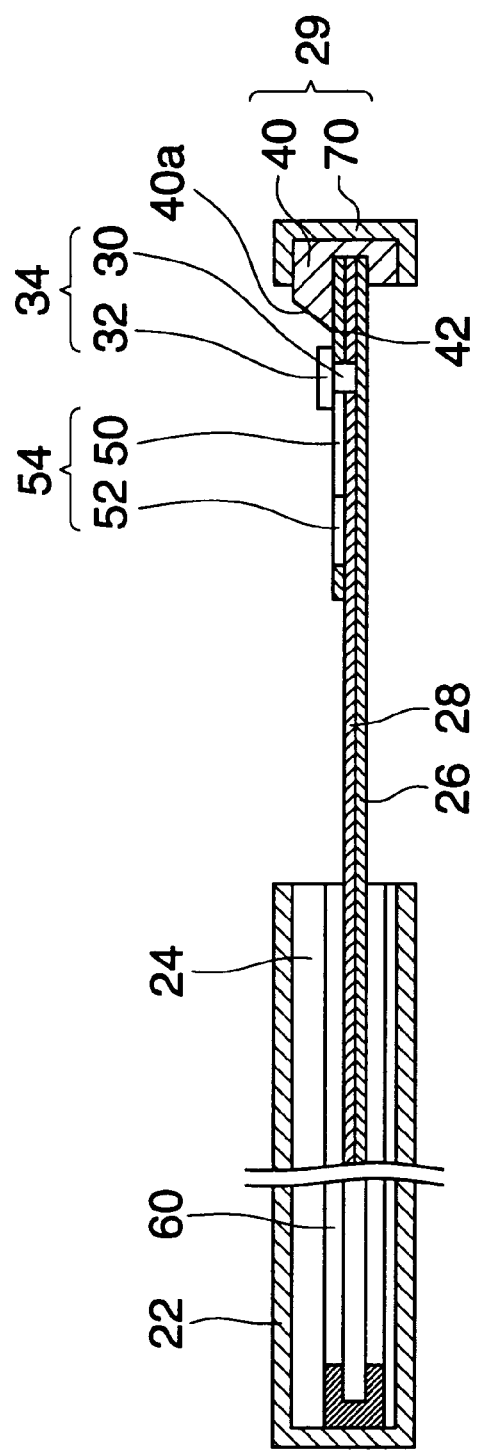
FIG. 16 is a sectional view taken on line D—D in FIG. 15.

As shown in FIGS. 15 and 16, on the surface of the tray 28 opposite to the surface on which radiographic image conversion plate 26 is provided, there are provided two stepped pins 34 each having small diameter section 30 on its base portion and small diameter section 32 on its tip portion. Incidentally, the base portion is a portion which is in contact with tray 28.

On the other hand, cap 29 is composed of cap member 70 which has a U-shaped section and covers opening 24 of case 22 and shields the inside of the case 22 optically, and of clipping member 40 which is provided on the recessed portion of the cap member 70 and is engaged with the opening 24 of the case 22 as shown in FIG. 16. On the clipping member 40, there is fixed guide plate 42.

On the guide plate 42, there are formed two elongated holes 54 each extending in the direction for inserting tray 28 (direction almost perpendicular to the cap 29). Each of these elongated holes 54 is extended in the direction for inserting tray 28, and is set in terms of width to be broader than a diameter of smaller diameter section 30 of the stepped pin 34 and to be narrower than larger diameter section 32, and is composed of first hole portion 50 that is set so that the cap 29 can engage with the opening 24 of the case 22 when the smaller diameter section 30 of the stepped pin 34 engages, and of a second hole portion 52 which is provided to be connected to the first hole portion 50 and has a width larger than a diameter of the larger diameter section 32 of the stepped pin 34.

Incidentally, FIGS. 15 and 16 show the state wherein the smaller diameter section 30 of the stepped pin 34 is engaged with the first hole section 50 of the elongated hole 54 and cap 29 is in the state of being capable of engaging with opening 24 of the case 22.

As shown in FIG. 16, clip member 40 is set to be in a form to interpose tray 28 and radiographic image converter plate 26, and slant portion 40a is further provided on the clip member 40.

Figure 17:
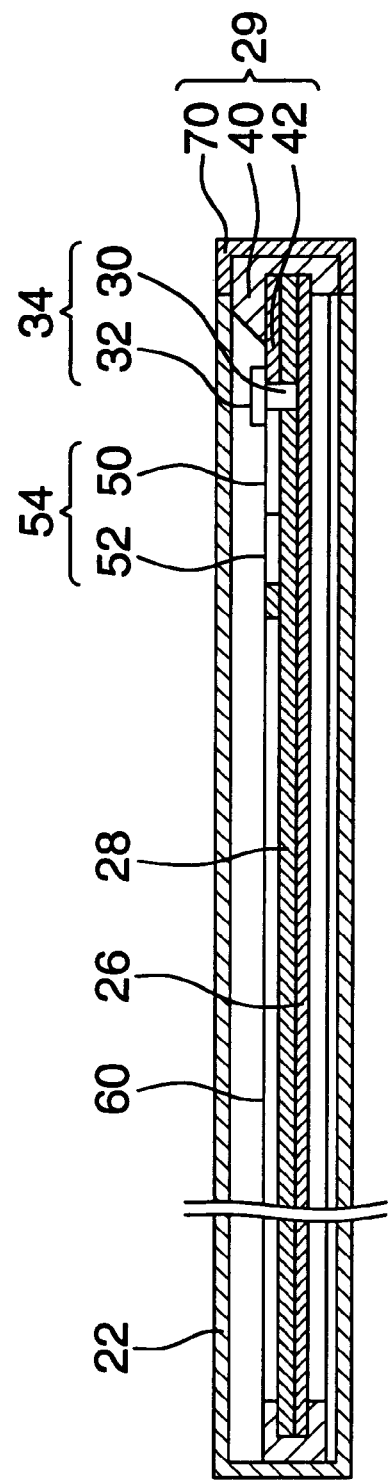
FIG. 17 is a sectional view showing the state wherein a tray in FIG. 15 is completely loaded in a case.

Therefore, as shown in FIG. 17, when the cap 29 is engaged with opening 24 of case 22, clip member 40 comes in pressure contact with an inner wall surface of the case 22 while being guided by the slant portion 40a of the clip member 40 so that the cap 29 may be prevented from coming off the case 22.

Figure 18:
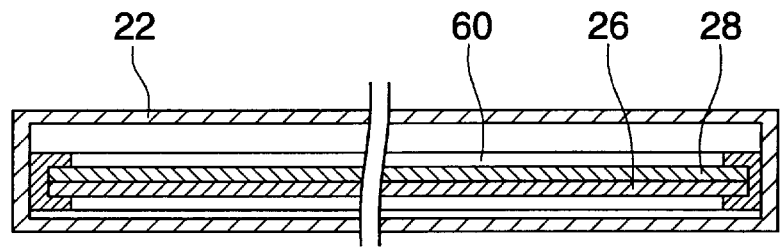
FIG. 18 is a sectional view taken on line E—E in FIG. 15.

In the case 22, there is provided guide 60 which has a sectional view that is almost U-shaped and supports and guides radiographic image converter plate 26 and tray 28, as shown in FIGS. 16–18.

In the aforesaid structure, to split the cap 29 and the tray 28 which are on the state of engagement, the cap 29 is required to be moved so that the smaller diameter section 30 of the stepped pin 34 may be located at the second hole portion 52 of the elongated hole 54 on the guide plate 42. Namely, in the state shown in FIG. 15, tray 28 is fixed and cap 29 is moved in the direction of arrow mark F.

Figure 19:
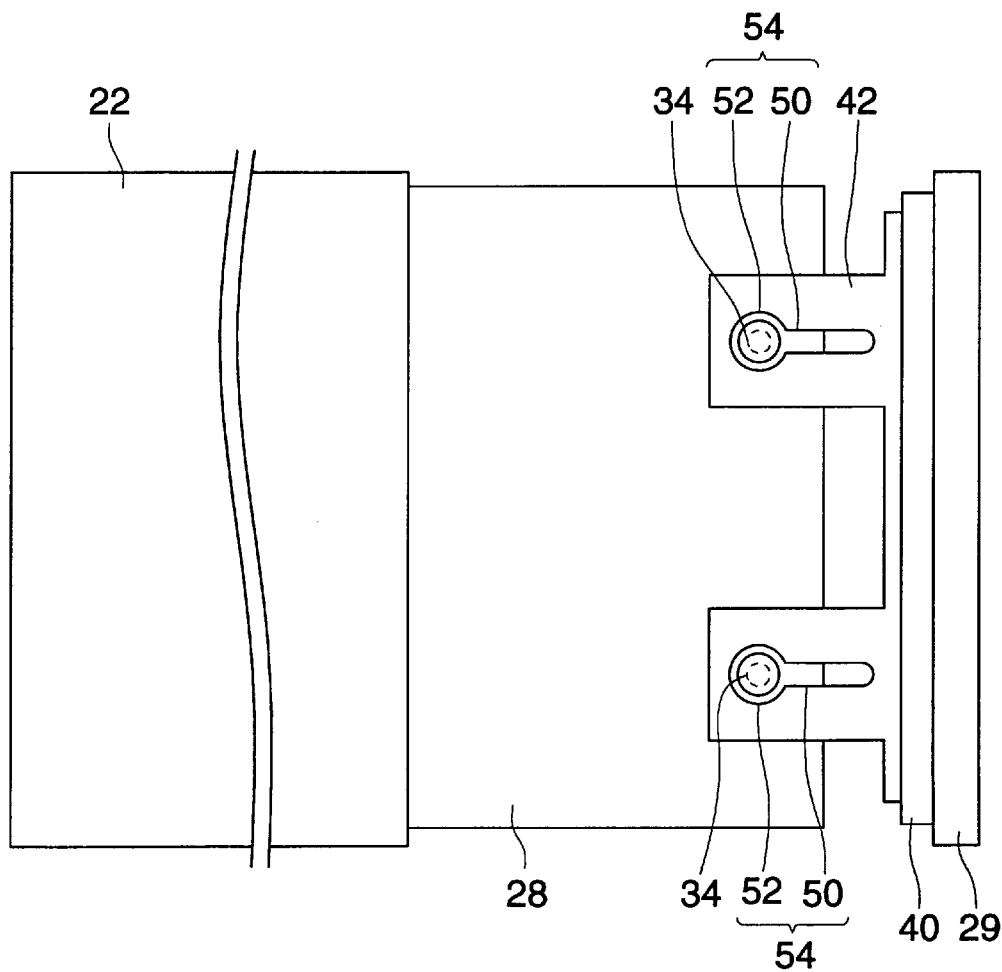
FIG. 19 is a diagram showing the state wherein a cap is moved in FIG. 15.
Figure 20:
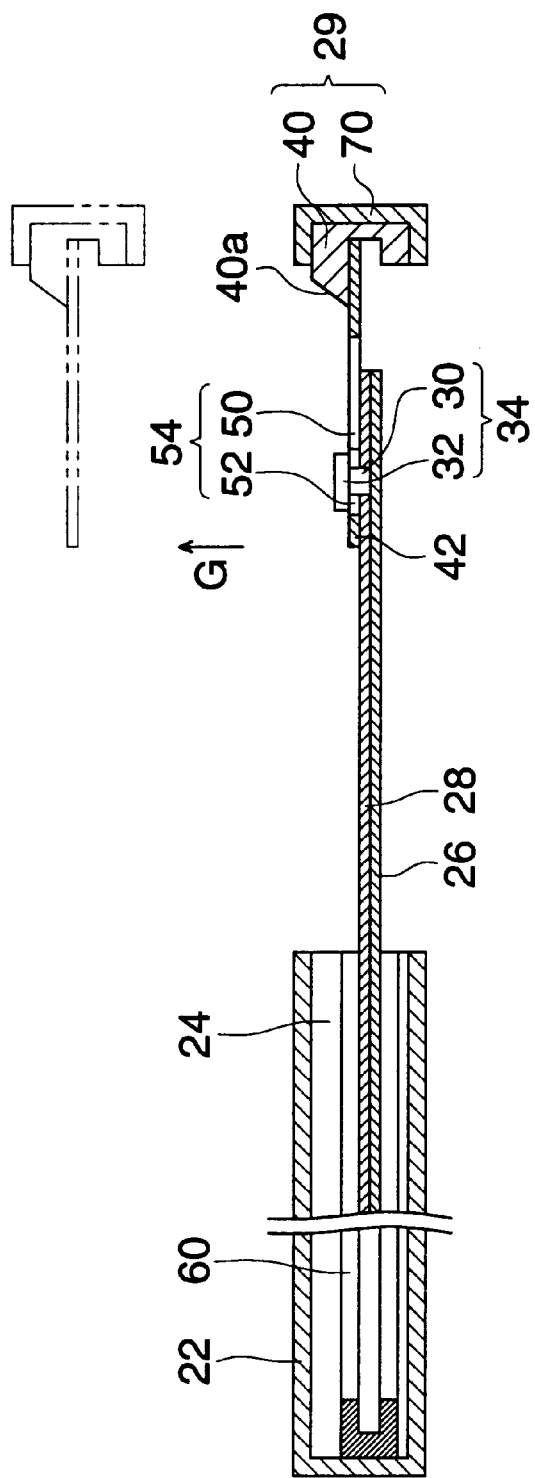
FIG. 20 is a diagram showing the state wherein a cap is moved in FIG. 16.

As shown in FIGS. 19 and 20, when the smaller diameter section 30 of the stepped pin 34 moves to the second hole portion 52 of the elongated hole 54 on the guide plate 42, the stepped pin 34 and the elongated hole 54 result in the state where they can be split, because the width of the second hole portion 52 of the elongated hole 54 is set to be wider than larger diameter section 32 of the stepped pin 34.

In this case, when the cap 29 is moved (shown with two-dot chain lines) in the direction to be away from the tray 28 (the direction marked with arrow G in FIG. 20) in the axial direction of the stepped pin 34, engagement between the stepped pin 34 and the elongated hole 54 is canceled and the cap 29 and the tray 28 are split.

When the cap 29 and the tray 28 are split, cleaning turns out to be easier.

The invention is not limited to the embodiment stated above. Though the elongated hole 54 extending in the direction almost perpendicular to the cap 29 is provided on guide plate 42 in the embodiment stated above, it is also possible to provide on the guide plate 42 the elongated hole 54 which extends in the direction that is almost in parallel with the cap 29 to be set in terms of width to be broader than the smaller diameter section 30 of the stepped pin 34 and to be narrower than the larger diameter section 32, and is composed of a first hole portion 50 that is set so that the cap 29 can engage with the opening 24 when the smaller diameter section 30 of the stepped pin 34 engages, and of second hole portion 52 which is provided to be connected to the first hole portion 50 and has a width larger than a diameter of the larger diameter section 32 of the stepped pin 34.

Figure 21:
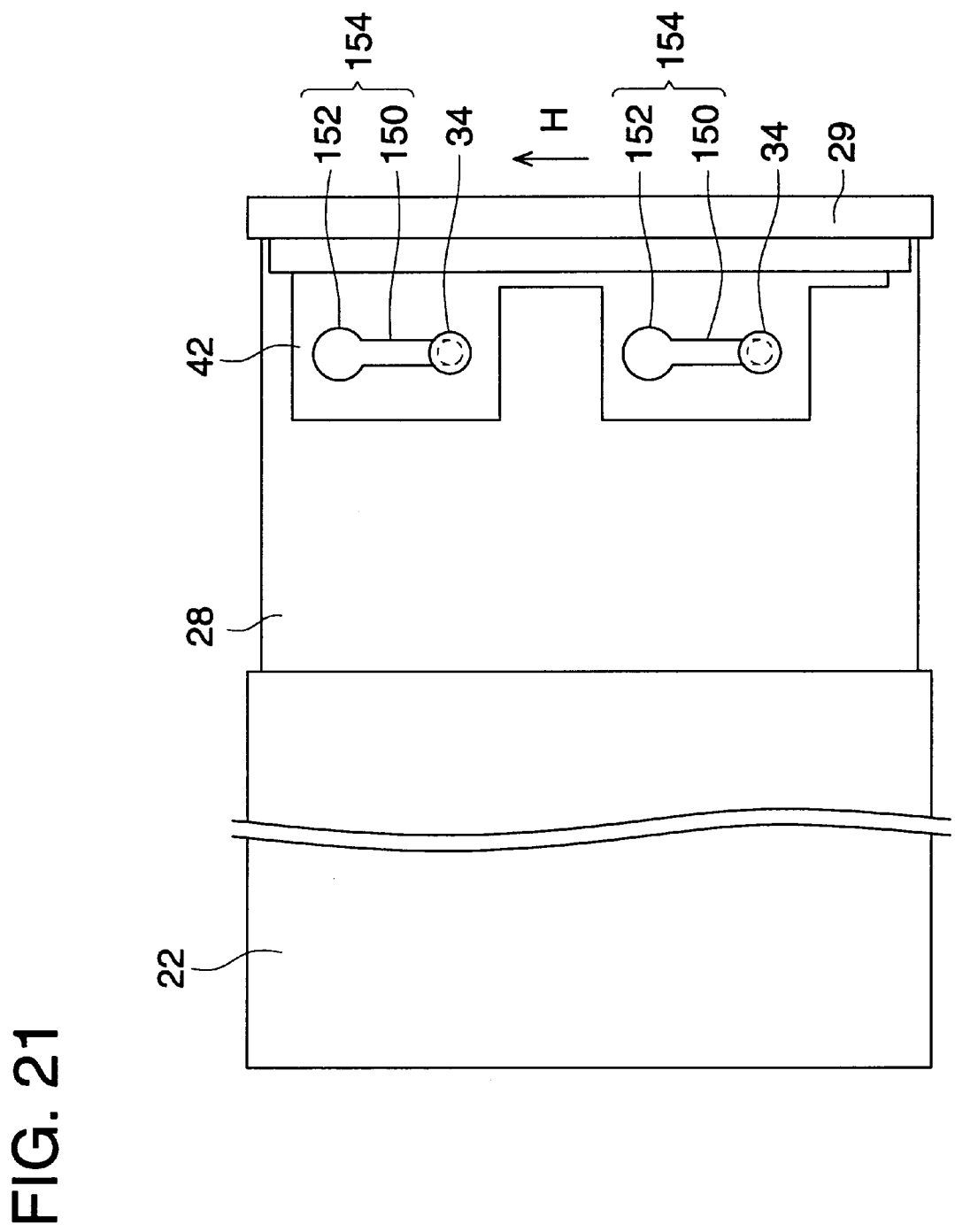
FIG. 21 is a diagram illustrating another embodiment.

In this case, to split the cap 29 and the tray 28 which are on the state of engagement, the cap 29 is required to be moved so that the smaller diameter section 30 of the stepped pin 34 may be located at the second hole portion 52 of the elongated hole 54 on the guide plate 42. Namely, in the state shown in FIG. 21, it is required that the tray 28 is fixed and cap 29 is moved in the direction of arrow mark H.

In the case that the cap can be engaged with the tray or disengaged from the tray, that is, in the case that the can and the tray are not constructed in a single body, it may be preferable that the tray can be moved together with the cap in the cassette on the condition that the cap is mounted on the tray.

The cap mentioned above is rigid and relatively bigger or thicker than the thickness of the tray, but the present invention should not be limited these type or shape of the cap. For example, a cap portion having the almost same thickness as that of the tray will be also used in the present invention. These type of the cap may be changed, for example, by bending, flexibly or rigidly extending, or other moving embodiment in order not to interrupt the reading by the scanning section 51 (acceptance section 514) in which the cap is arranged not to contact with at least the acceptance section 514.

As stated above, the second example brings the same effect as in the first example. Further, owing to an arrangement to make the cap to be mounted on the tray detachably, it is possible to clean after separating the cap from the tray in the case of cleaning, which makes cleaning easy.

Cassette Example 3

Though cap 907 is mounted on tray 904 slidably in Examples 1 and 2, the invention is not limited to these examples.

In the example shown in FIG. 22(a), cap 907 is mounted on tray 904 by means of hinge 920.

In the example shown in FIG. 22(b), cap 907 is mounted on tray 904 by means of 922 representing a leaf spring, resin or rubber.

In the example shown in FIG. 22(c), cap 907 is mounted on tray 904 by means of coil spring 924.

By constituting so that the cap can move to the rear of the tray in the course of image reading as in the foregoing, it is possible to obtain the same effect as in the cassette in Examples 1 and 2.

Cassette Example 4

In the example shown in FIG. 23, cap 907 is mounted solidly on tray 904 by means of resin portion 926. As illustrated, by constituting so that the resin portion 926 can be bent by bar 950 and thereby the cap can move to the rear of the tray in the course of image reading, it is possible to arrange a converter plate so that it may come in close contact with a photoreceptor section of an image reading section and thereby to obtain an effect to prevent a decline of reading accuracy for radiographic images. Incidentally, it is possible either to arrange so that bar 950 interlocks with reading section 5 to move in the sub-scanning direction, or to arrange so that a bar having a length corresponding to the cap length is fixed on the apparatus.

The present example makes it easy to clean the base portion of the cap.

Cassette Example 5

Though a rigid tray is used in Cassette Examples 1–4, it is also possible to structure a tray made of elastic body by the use of a resin plate which can be curved and is restorable.

As shown in FIG. 24, by constituting so that tray 960 can be bent by bar 950 and thereby the cap 907 can move to the rear of the tray in the course of image reading, it is possible to arrange a converter plate so that it may come in close contact with a photoreceptor section of an image reading section and thereby to obtain an effect to prevent a decline of reading accuracy for radiographic images. Incidentally, in the present example, when the reading section representing a scanning type moves relatively to the conversion plate, it is preferable that a transparent regulating plate 970 is provided to face the conversion plate in front of the reading section so that deformation of the tray may be corrected, as shown in FIG. 24(*a*).

Cassette Example 6

As shown in FIG. 24(*b*), a cap 907 may be provided to a converting plate 12 itself with a resin section 926 without mounting the converting plate on a tray and without providing the cap onto the tray so as to be shiftable relatively to the tray. With the above manner, the structure that the cap is provided to the converting plate so as to be shiftable relatively to the converting plate may applicable to the other Example mentioned above.

In this case, a metal such as aluminum, magnesium, stainless steel, copper, and nickel, acrylic resin, polycarbonate, carbon fiber and PET (polyethyleneterephthalate) may be used as the support of the converting plate. By using the above materials as the support, the converting plate can keep its flatness, whereby the deterioration of the read image in image quality can be avoided. Among the above materials, the material having rigidity is used as the support, the cap can be structured so as to be provided to the support without using the tray additionally. Further, if aluminum or magnesium is used as the support, the converting plate can be made to be light. Furthermore, a cassette is made to be a converting plate-built-in cassette. Whereby the handling ability can be enhanced.

What is claimed is:

1. A cassette in which a radiographic image converting plate is accommodated, comprising:

a case having an opening;

a tray on which the radiographic image converting plate is loaded; and a cap capable of being fitted with the opening, the cap connected with the tray so that the tray is moved together with the cap so as to be inserted into or drawn out from the case through the opening, the position of the cap capable of being displaced relative to the tray.

2. The cassette of claim 1, wherein the cap is fitted with the opening on the condition that the tray is accommodated in the case.

3. The cassette of claim 2, wherein the cap is fitted with the opening on the condition that the tray is accommodated in the case such that the inside of the case is shielded from light.

4. The cassette of claim 1, wherein when the radiographic image converting plate is loaded on the tray, the cap is shifted to be placed far from an image forming region of the radiographic image converting plate to be read by an image reader.

5. The cassette of claim 4, wherein the cap is displaced in a direction parallel to the surface of the radiographic image converting plate or in a direction perpendicular to the surface of the radiographic image converting plate.

6. The cassette of claim 4, wherein the cap is displaced toward the surface of the tray reverse to the image forming surface of the radiographic image converting plate when the radiographic image converting plate is placed on the tray.

7. The cassette of claim 4, further comprising:

a connecting member to connect the cap with the tray such that the position of the cap can be displaced relative to the tray.

8. The cassette of claim 7, wherein the connecting member comprises an elastic member to connect the cap with the tray.

9. The cassette of claim 7, wherein the tray is provided with a stepped pin having a smaller diameter section that is in contact with the tray and a larger diameter section that is located at the tip portion of the pin and the cap is provided with an elongated hole composed of a first hole portion which is set to be broader than the smaller diameter section of the stepped pin and to be narrower than the larger diameter section and a second hole portion having a width larger than the larger diameter section of the stepped pin, and wherein the cap is engaged with the tray when the first hole is engaged with the smaller diameter section and the cap is disengaged from the tray when the second hole is disengaged from the larger diameter section.

10. The cassette of claim 7, wherein the cap comprises a cap member which covers the opening of the case and shields the inside of the case against light, a clip member which is provided on the cap member and is engaged with the opening of the case, and a guide plate provided with the elongated hole, and wherein the guide plate is provided on the clip member and is made to be almost in parallel with the tray when the cap is engaged with the opening of the case.

11. The cassette of claim 1, wherein the cap is constructed to be able to be engaged with or disengaged from the tray.

12. The cassette of claim 1, wherein the cap has a height in a direction perpendicular to the surface of the radiographic image converting plate when the radiographic image converting plate is loaded on the tray and the height is larger than the thickness of the radiographic image converting plate.

13. The cassette of claim 1, wherein the cap has a configuration to cover a part of the surface of the tray on which the radiographic image converting plate is loaded when the cap is positioned closest to the tray.

14. A cassette in which a radiographic image converting plate is accommodated, comprising:

a case having an opening; and a cap capable of being fitted with the opening, the cap connected with the radiographic image converting plate so that the radiographic image converting plate is moved together with the cap so as to be inserted into or drawn out from the case through the opening, the position of the cap capable of being displaced relative to the tray.

15. The cassette of claim 14, wherein the cap is fitted with the opening on the condition that the radiographic image converting plate is accommodated in the case.

16. The cassette of claim 15, wherein the cap is fitted with the opening on the condition that the radiographic image converting plate is accommodated in the case such that the inside of the case is shielded from light.

17. The cassette of claim 14, wherein in r elation to the radiographic image converting plate, the cap is shifted to be placed far from an image forming region of the radiographic image converting plate to be read by an image reader.

18. The cassette of claim 14, wherein the cap is displaced in a direction parallel to the surface of the radiographic image converting plate or in a direction perpendicular to the surface of the radiographic image converting plate.

19. The cassette of claim 14, wherein t he cap is displaced toward the surface of the radiographic image converting plate reverse to the image forming surface of the radiographic image converting plate.

20. The cassette of claim 14, further comprising:
a connecting member to connect the cap with the radiographic image converting plate such that the position of the cap can be displaced relative to the radiographic image converting plate.

21. The cassette of claim 14, wherein the cap is constructed to be able to be engaged with or disengaged from the radiographic image converting plate.

22. A tray which can be accommodated together with a recording image converting plate in a case having an opening, comprising:
a plate on which the recording image converting plate can be mounted; and
a cap mounted on the plate such that the cap is shiftable relatively to the plate, the cap capable of engaging with the opening of the case.

23. The tray of claim 22, wherein the cap is constructed so as to be mounted on the tray or dismounted from the tray.

* * * * *